US009430932B2

(12) United States Patent
Jim

(10) Patent No.: US 9,430,932 B2
(45) Date of Patent: Aug. 30, 2016

(54) HAND LUGGAGE REMINDER FOR VEHICLE PASSENGER

(71) Applicant: Reminder Company Limited, Hong Kong (HK)

(72) Inventor: Kwok Fai Jim, Hong Kong (HK)

(73) Assignee: REMINDER COMPANY LIMITED, Hong Kong (HK)

(*) Notice: Subject to any disclaimer, the term of this patent is extended or adjusted under 35 U.S.C. 154(b) by 268 days.

(21) Appl. No.: 14/337,236

(22) Filed: Jul. 22, 2014

(65) Prior Publication Data

US 2015/0022333 A1 Jan. 22, 2015

(30) Foreign Application Priority Data

Jul. 22, 2013 (CN) .......................... 2013 1 0309264

(51) Int. Cl.

*B60Q 1/00* (2006.01)
*G08B 21/24* (2006.01)
*A45C 13/18* (2006.01)
*A45C 13/24* (2006.01)

(52) U.S. Cl.

CPC ............... *G08B 21/24* (2013.01); *A45C 13/18* (2013.01); *A45C 13/24* (2013.01)

(58) Field of Classification Search

CPC ....... G08B 21/24; A45C 13/18; A45C 13/24
USPC .................................................. 340/434, 457
See application file for complete search history.

(56) References Cited

U.S. PATENT DOCUMENTS

| | | | | |
|---|---|---|---|---|
| 2,705,316 A * | 3/1955 | Harris | B60Q 3/06 340/434 |
| 2010/0271202 A1* | 10/2010 | Lin | B60R 25/00 340/540 |
| 2012/0242476 A1* | 9/2012 | Schoenberg | B60N 2/002 340/457 |
| 2013/0339026 A1* | 12/2013 | Lee | G06Q 10/109 704/274 |

(Continued)

FOREIGN PATENT DOCUMENTS

| | | |
|---|---|---|
| CN | 2487608 Y | 4/2002 |
| CN | 202306783 U | 7/2012 |

OTHER PUBLICATIONS

Search Report Related to "Hand Luggage Reminder for Vehicle Passenger" Conducted by the State Intellectual Property Office of China issued on Oct. 28, 2013.

(Continued)

*Primary Examiner* — Jack K Wang

(57) ABSTRACT

The present invention discloses a hand luggage reminder comprising a mainbody (1) operationally connected with a first and a second electric switch boxes (21, 22), a small permanent magnetic rod set (33), and a strong permanent magnet (43); and the mainbody further comprises a main electric switch box (5) operationally connected with a battery box (11), a sound generator box (12), and a permanent magnetic push-to-break switch (16) for easy controlling the sound for reminding a passenger on a vehicle to take out personal belongings while leaving the vehicle. After depressing a button (161) of the push-to-break switch (16) to stop the reminding sound, it needs no another button pressing to restore the reminding function because the reminder cannot be switched off by pressing the button (161). Closing the car door can also stop the reminding sound. The present invention is waterproof, low in cost, easy in installation and operation.

10 Claims, 25 Drawing Sheets

(56) References Cited

U.S. PATENT DOCUMENTS

2014/0203055 A1* 7/2014 Salinas .................... A45C 3/04 224/486
2014/0218189 A1* 8/2014 Fleming ................. G08B 21/24 340/457
2014/0277841 A1* 9/2014 Klicpera .................. A45C 5/14 701/2
2015/0061856 A1* 3/2015 Raman ................... G08B 21/24 340/457
2015/0254963 A1* 9/2015 Kakinuma ............. B60Q 5/005 340/457
2015/0287315 A1* 10/2015 Saville-Sewell ....... G08B 21/24 340/539.32
2016/0063849 A1* 3/2016 Hasegawa ............. H04M 19/04 340/539.32

OTHER PUBLICATIONS

International Search Report of PCT Patent Application No. PCT/CN2014/082153 issued on Oct. 21, 2014.

* cited by examiner

HAND LUGGAGE REMINDER FOR VEHICLE PASSENGER

CROSS REFERENCE TO RELATED APPLICATIONS

The present application claims the benefit of priority from Chinese Patent Application No. 201310309264.0 filed on Jul. 22, 2013, the disclosure of which is incorporated herein in its entirety by reference.

FIELD OF THE INVENTION

The present invention relates to a hand luggage reminder for vehicle passenger, and more particularly to a reminder device for reminding the passenger on a vehicle to take out personal luggage or belongings while leaving the vehicle.

DESCRIPTION OF RELATED ART

Taxi is an essential traffic means in the daily life. Many taxi passengers leave inadvertently their belongings in the taxi. In Hong Kong, there is a telephone hot line for those passengers to report their lost belongings in the taxi and see if they can get their things back, but the chance for claiming lost items will depend on the moral integrity of the taxi driver and/or the next passenger thereof. Most of those lost items will be taken away by the next passenger of the taxi. According to the news report, there are about 10,000, and 1,000 reported cases per month in London for leaving inadvertently mobile phones, and portable computers or iPods respectively in taxis, which have excluded the number of lost of other items as well as the number of cases of theft by finding. Similar situations are expected to be found to exist in other cities. Further, private car users sometimes might forget to take out things as they should when leaving their cars, and thus it is inconvenient and waste of time to go back to the car park to take out those things. As there is too much uncertainty to rely on one's honesty or memory to avoid the risk of lost property and people are often negligent, it is necessary to adopt scientific methods to avoid such situations, and it is desirable to remedy such troubles and losses caused by intrinsic defects of human brain with a specific device.

BRIEF SUMMARY OF THE INVENTION

In order to solve at least partially the above problems, the present invention provides a hand luggage reminder for use in an automobile comprising a mainbody operationally connected with a first and a second electric switch boxes, a small permanent magnetic rod set, and a strong permanent magnet; and the mainbody further comprises a main electric switch box operationally connected with a battery box, a sound generator box, and a permanent magnetic push-to-break switch for controlling and switching the sound generator box; wherein the mainbody is embedded into a door of the automobile or arranged on an outer surface of the door inside the automobile, and the small permanent magnetic rod set is mounted at a front side or a back side of a door opening handle and cooperated with the first electric switch box arranged below the door opening handle such that a reminding sound is generated via switching on the sound generator box when the door is opened by pulling the door opening handle, and the strong permanent magnet is arranged along an edge of a door frame or on a cabin floor of the automobile and cooperated with the second electric switch box arranged on the door at a position near the edge of the door frame or a bottom edge of the mainbody such that the reminding sound is stopped via switching off the sound generator box when the door is closed.

According to an embodiment of the present invention, the small permanent magnetic rod set comprises a small permanent magnetic rod holder and a permanent magnetic rod, wherein the small permanent magnetic rod holder is provided with a color scale line; the first electric switch box is a standard reed switch box comprising a box body and a reed switch, wherein each of both sides of the first electric switch box is provided with a color scale line for indicating a preset magnetic induction point and facilitating its positioning in relation to the color scale line of the small permanent magnetic rod set; and the second electric switch box is a permanent magnet reed switch box, which is a standard reed switch box further comprising a permanent magnet and a magnet fixing cover, wherein the permanent magnet is fixed by the magnet fixing cover and its north pole or south pole aligns with one of the preset magnetic induction points of the standard reed switch box, so as to switch on the reed switch and form a magnetic push-to-break switch; and the strong permanent magnet is provided with a color scale mark at one of its end faces for showing its polarity and facilitating its installation, such that the polarity of the one of its end faces of the strong permanent magnet facing an end face of the second electric switch box enables a predetermined electromagnetic switching action in the second electric switch box.

Alternatively, the first electric switch box and the second electric switch box both are a standard reed switch box; or the first electric switch box is a permanent magnet reed switch box and the second electric switch box is a standard reed switch box; or the first electric switch box and the second electric switch box both are a permanent magnet reed switch box.

According to another embodiment of the present invention, the permanent magnet push-to-break switch comprises an upper part having a plurality of recesses, a third electric switch box, a sound stopping button, a small strong permanent magnet, a spring and a supporting cover for the sound stopping button; wherein a portion of the third electric switch box is received in a first recess of the upper part, the spring is fixed by the supporting cover, and the supporting cover is provided with two elongated pillars inserted into and positioned by another two second recesses of the upper part, and the sound stopping button is provided with a small hole for receiving the small strong permanent magnet and also provided with two notches at its brim for matching with inwardly thickened parts of the two elongated pillars of the supporting cover for preventing the sound stopping button from rotating and enabling the small strong permanent magnet to be aligned with a preset magnetic induction point of the third electric switch box under thrust of the spring, so as to form a magnetic enabled push-to-break switch; wherein the third electric switch box is switched off as its magnetic induction being stopped by fully pressing the sound stopping button, such that the reminding sound is stopped as the sound generator box is switched off. After pressing the button of the push-to-break switch to stop the reminding sound, it needs no another button pressing to restore the reminding function because the reminder will not be switched off by pressing the button.

According to a further embodiment of the present invention, the mainbody might be arranged at a position of the door corresponding to a lower lateral side of a seat of the automobile. Preferably, a safety cushion might be arranged at outside of the mainbody and/or the first and the second electric switch boxes.

According to still another embodiment of the present invention, the sound generator box (12) comprises a loudspeaker, a box base and a box cap forming a space for receiving the loudspeaker; wherein the box base comprises fence-like bars for enabling a cable connection of the loudspeaker, and the box cap is provided with a plurality of pores for sound transmission and mounted with the box base in a screw-thread fit manner, a snap fit manner, a snug fit manner, or an adhesive manner.

According to yet still another embodiment of the present invention, the battery box comprises a circuit box in which a battery compartment is enclosed, wherein the circuit box is respectively in cable connection with the main electric switch box, the first electric switch boxes, the second electric switch boxes, the sound generator box, the permanent magnetic push-to-break switch, and the battery compartment. Preferably, the battery box further comprises an upper portion for preventing displacement of a battery arranged in the battery compartment.

According to a further embodiment of the present invention, the main electric switch box comprises a main switch base plate connected with a forth electric switch box, a main switch cover and a push switch; wherein the push switch comprises a push switch housing connected with a permanent magnet and a push switch cover; wherein an upper portion of the main switch cover is provided with an opening forming a guide slot for displacement of the push switch and a narrow slightly protruded part at one side of the opening for fixing the push switch in a predefined position; and the main electric switch box is in electric connection with a circuit box inside the battery box.

According to another embodiment of the present invention, it further comprises a switch control device; wherein the automobile is a taxi comprising a taxi meter, a door opening button, and a door closing button; and the switch control device comprises a main sound box in operational connection with an electric switch, a push-to-make switch, and a push-to-break switch; wherein one end of the main sound box is coupled with the electric switch connected and activated simultaneously with the taxi meter and the push-to-make switch in serial connection with the electric switch and also connected and activated simultaneously with the door opening button for generating the reminding sound; and another end of the main sound box is coupled with the push-to-break switch in serial connection with the push-to-make switch, wherein the push-to-break switch is connected and activated simultaneously with the door closing button for stopping the reminding sound from the main sound box; wherein the push-to-break switch and the push-to-make switch are configured in such a manner that a tiny spark by switching the push-to-break switch and the push-to-make switch does not ignite an explosion of an external flammable gas probably existed therein.

Preferably, the push-to-break switch and/or the push-to-make switch is received in a respective cylindrical container sealed with a screwing cap, a shaft inserted through a vertical bearing into the screwing cap and positioned on the push-to-break switch or the push-to-make switch, and the shaft is fixed to a ring with its lower end and fixed to a push button with its upper end, and the ring and the push button retain the shaft in the vertical bearing of the screwing cap in such a manner that the shaft is enabled to move up and down over a small range of distance.

Summing up the above, the present invention provides a hand luggage reminder for use in an automobile and being low in cost and in conformity with safety requirements for driving, which could remind the passenger on a vehicle to check and take out personal luggage or belongings that should not be left behind while leaving the vehicle. The present invention is highly applicable and relatively low in cost, while it is waterproof and will not ignite an explosion of a flammable gas that probably existed in the surroundings.

LIST OF REFERENCE SIGNS IN THE DRAWINGS

1: mainbody, 2: standard reed switch box or permanent magnet reed switch box with small safety cushion, 3: permanent magnetic rod box, 5: main electric switch box, 6: polyfoam piece, 7: flash light, 8: rubber clip, 10: safety cushion, 11: battery box, 12: sound generator box, 16: permanent magnet push-to-break switch, 17: upper pillar for mounting magnet fixing piece, 20: small safety cushion, 21: standard electric switch box, 22: permanent magnet electric switch box, 31: permanent magnetic rod box shell, 32: permanent magnetic rod, 33: small permanent magnetic rod set, 36: car cabin floor, 37: car seat, 38: door opening handle, 39: car door, 43: strong permanent magnet, 51: main switch box base plate, 52: main switch box cover, 53: push switch, 101: velcro part of safety cushion, 111: battery compartment, 112: circuit box, 113: battery box base, 114: battery box cap, 121: loudspeaker, 122: sound generator box base, 123: sound generator box cap, 161: sound stopping button, 162: strong permanent magnet, 163: spring, 164: supporting cover, 165: upper part of permanent magnet push-to-break switch, 166: rivet, 171: lateral pillar for mounting magnet fixing piece, 201: electric switch, 202: push-to-make switch, 203: push-to-break switch, 211: standard reed switch box shell, 212: reed switch, 221: permanent magnet reed switch box without permanent magnet and cover, 222: strong permanent magnet, 223: magnet fixing cover, 331: small permanent magnetic rod holder, 332: permanent magnetic rod, 431: magnet fixing piece, 432: magnet protector, 531: push switch housing, 532: push switch cover, 1011: loop part of Velcro, 1012: hook part of Velcro, 1121-1126: cables extended from circuit box, 2021: cylindrical container, 2022: body of cylinder container, 2023: screwing cap, 2024: shaft, 2025: centre bearing tube, 2026: push button, 2027: ring, 2031: cylindrical container, 2032: body of cylinder container, 2033: screwing cap, 2034: shaft, 2035: centre bearing tube, 2036: push button, 2037: ring.

In FIG. 49-FIG. 53, the bracketed number follow the reference sign of a component represents the reference sign of the assemblage to which the component belongs, e.g. 212 (5) means the reed switch 212 is a component of the main electric switch box 5.

DETAILED DESCRIPTION OF EMBODIMENTS OF THE INVENTION

The details of the present invention will be described hereunder to enable a better understanding of the embodiments thereof. However, it will be understood by those skilled in the art that the embodiments may be carried out without one or more specific details, or they could work with other devices, systems, assemblies, processes, materials, components, or the like, while the well-known configurations, materials, or operations will not be specifically shown or described in detail so as not to obscure the embodiments of the present invention.

Figure 1:
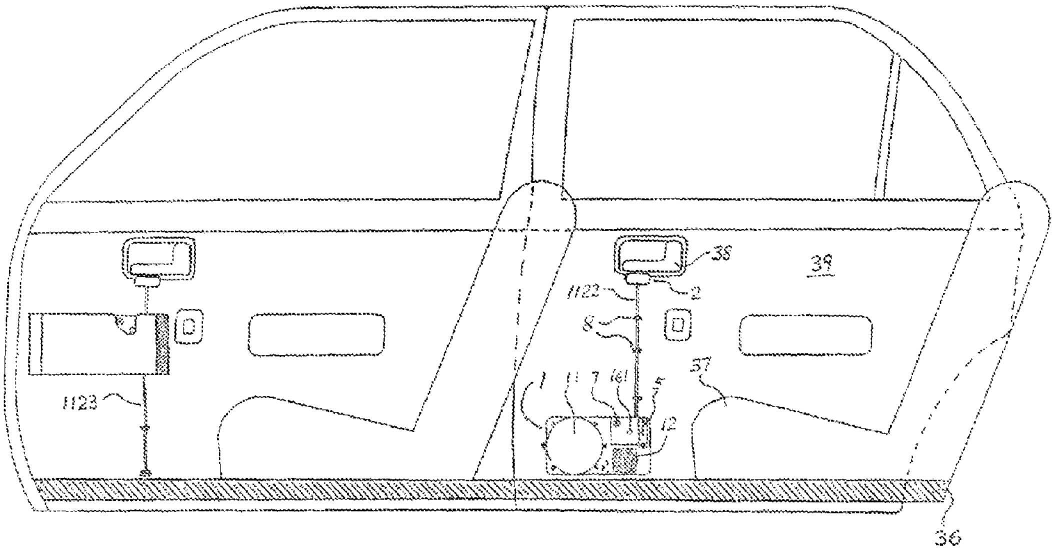
FIG. 1 is a lateral view showing the hand luggage reminder of the present invention mounted on the door of an automobile, wherein the mainbody of the hand luggage reminder mounted on the front door is provided with a safety cushion.

As shown in FIG. 1, the present invention might be installed separately on each of doors of an automobile, or the present invention might be embedded or concealed in respective doors while assembling the automobile, such that only two switches will be exposed therefrom and the overall installation cost will be reduced significantly; wherein one of the switch is used for stopping the reminding sound and the other switch is used for switching off the function of generating the reminding sound.

The chief function or main feature of the present invention lies in that a signal or a reminding sound will be activated only when the door is opened from inside the automobile, and the reminding sound will be deactivated automatically when the door is closed.

The first supplementary function or feature of the present invention lies in that the reminding sound could be stopped at once by pressing merely one button, and it requires no any further button-pressing operation to restore the function of generating the reminding sound because the reminder will not be switched off by pressing the button.

The second supplementary function or feature of the present invention lies in that the function of generating the reminding sound could be disabled as desired by pressing and keeping the button of electric switch at its depressed position when opening the door with the door opening handle until the door is opened at a preset angle or a preset amount and the door opening handle is restored to its initial position.

The preferred embodiments of the present invention will be described in details below with reference to the accompanying drawings, wherein two basic circuitries are respectively employed therein.

First Embodiment

The present embodiment employs a conventional domestic door bell circuitry (FIGS. 49A, 49B, and 53) of which the IC is the same as that of a conventional domestic door bell music box.

As shown is FIG. 1, the mainbody 1 of the hand luggage reminder of the present invention mounted on the front door of the automobile is provided with a safety cushion 10, a standard electric switch box 2 with a small safety cushion 20, a small permanent magnetic rod set 33 (mounted on the back of the door opening handle 38) a permanent magnet electric switch box 22 mounted on the front door near the cabin floor inside the automobile, and a strong permanent magnet 43 (not shown) fixed at the cabin floor nearby one end of the permanent magnet electric switch box. The mainbody mounted on the back door is shown without the safety cushion for easy labelling of various components thereof. The permanent magnet electric switch box 22 is fixed on the bottom edge of the mainbody to cooperate with the strong permanent magnet 43 fixed at the cabin floor and acted as a magnetic source for magnetic induction switching.

Figure 9:
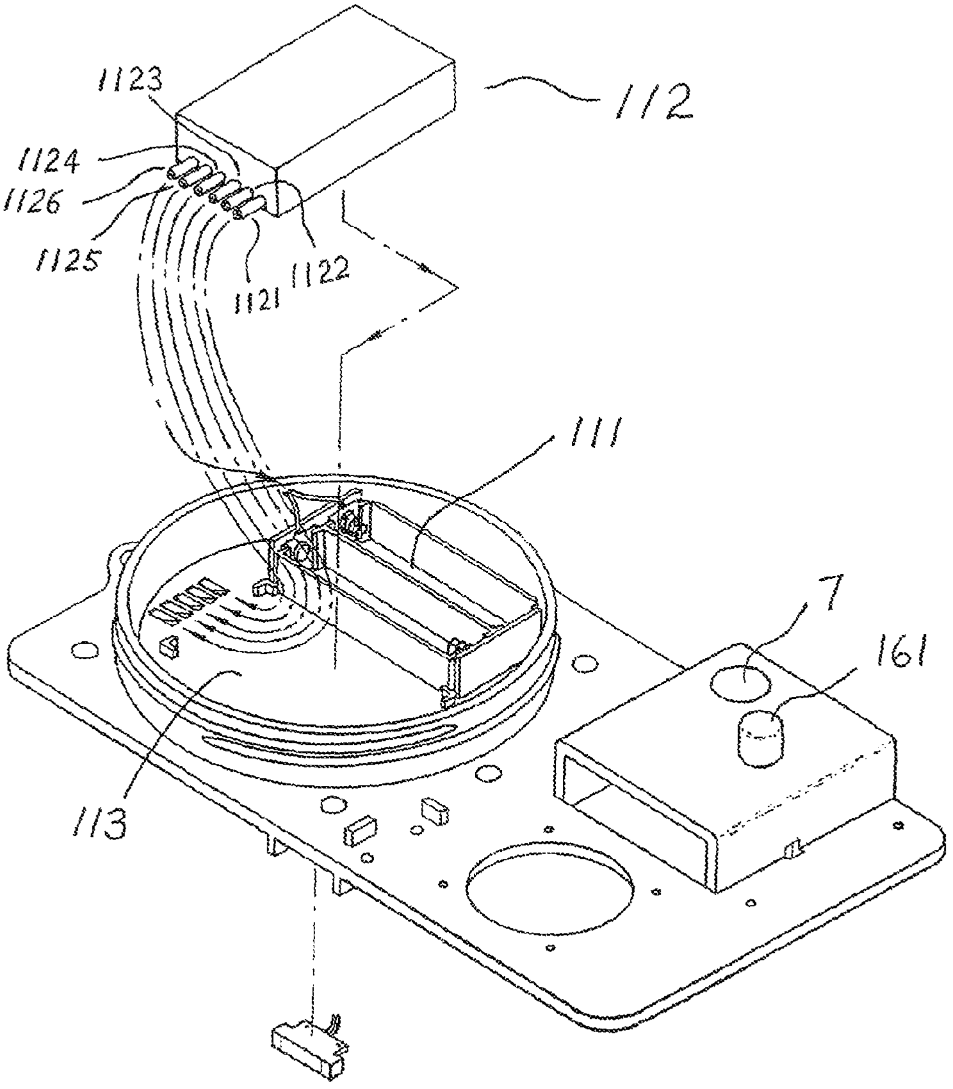
FIG. 9 is a schematic view showing the installation of the watertight circuit box in the battery box and the installation of the electric switch box at the bottom edge of the mainbody.
Figure 10:
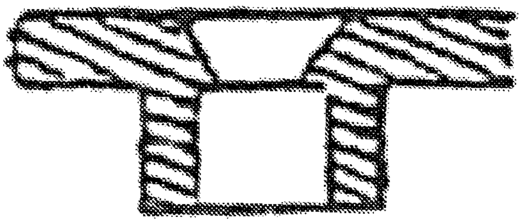
FIG. 10 is a sectional view showing the screw-fixing hole.
Figure 11:
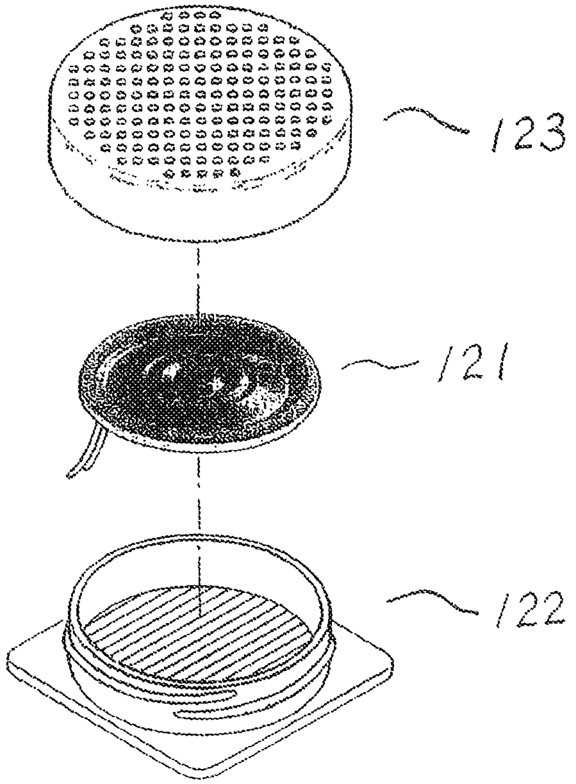
FIG. 11 is an exploded view of the sound generator box.
Figure 17:
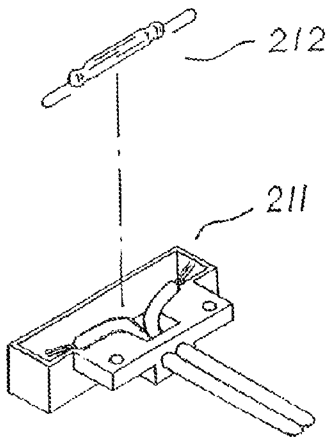
FIG. 17 is an exploded view of the standard reed switch box.
Figure 18:
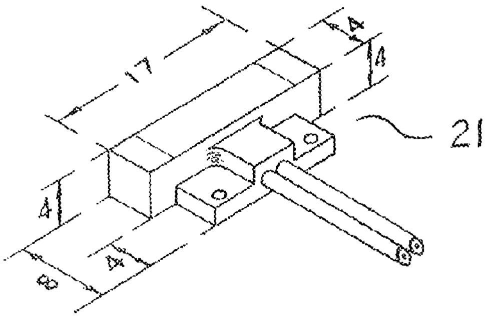
FIG. 18 shows the dimensions of the standard reed switch box.
Figure 19:
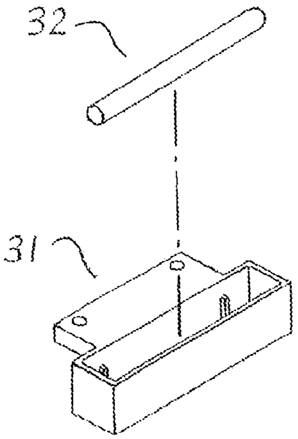
FIG. 19 is an exploded view of the permanent magnetic rod box.
Figure 20:
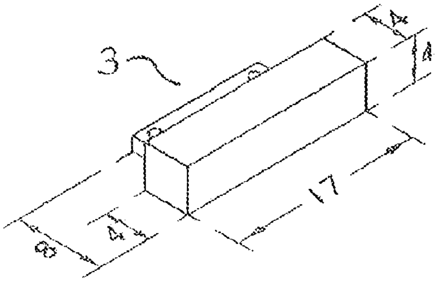
FIG. 20 shows the dimensions of the permanent magnetic rod box.
Figure 21:
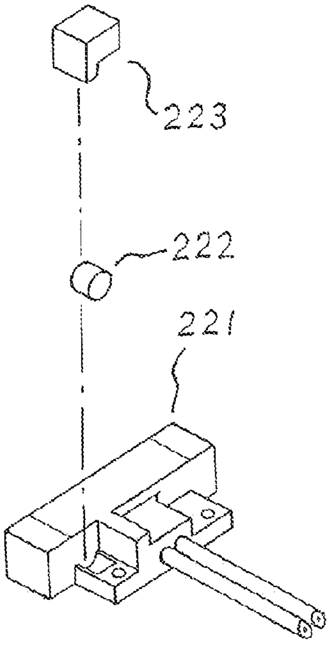
FIG. 21 is an exploded view of the permanent magnet reed switch box.
Figure 22:
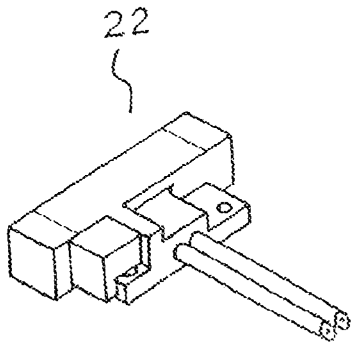
FIG. 22 illustrates the assembled permanent magnet reed switch box.
Figure 23:
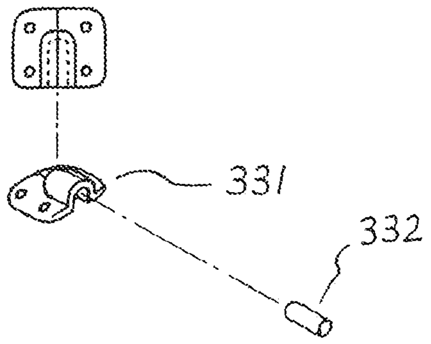
FIG. 23 is an exploded view of the small permanent magnetic rod set.
Figure 24:
FIG. 24 illustrates the assembled small permanent magnetic rod set.
Figure 25:
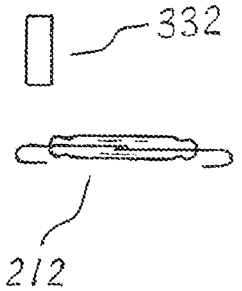
FIG. 25 illustrates that both sides of the reed switch can be magnetic induced in the appropriate magnetic induction zone causing the reed switch to conduct electricity.
Figure 26:
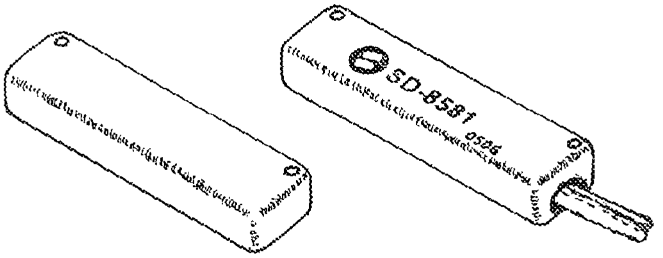
FIG. 26 illustrates that the connection cable of the reed switch box can be extended from one end rather than the middle part thereof.

The function and installation of each of the components of the present invention is described in details as follows. The small permanent magnetic rod set 33 is mounted on the back of the door opening handle, preferably at a distance of about 10 mm from the end of the handle, and it comprises a small permanent magnetic rod holder and a permanent magnetic rod of a diameter of 2.4 mm and a length of 6 mm (FIG. 23). The middle part of the rod holder is provided with a color scale line for providing a visual indication for the mounting of the standard electric switch box 21, which is preferably mounted within a distance of about 5 mm from the rod set. The present invention might adopt the magnetic contact of model no. SD-8571 or SD-8581 (FIG. 26) from Shenzhen Sunwave Electronics Co. Ltd as the standard electric switch box. Magnetic contacts from other vendors might also be used providing that they could be fitted in or fitted on the recessed portion of the door opening handle. The standard electric switch box of the present invention is provided with two color scale lines, each of which is located about 3 mm from respective end of the electric switch box to indicate its best magnetic induction point/position for switching. The permanent magnet electric switch box 22 (FIGS. 9 and 22) comprises the standard electric switch box and a permanent magnet 222 and a magnet fixing cover 223 (FIG. 21), wherein the permanent magnet is fixed by the magnet fixing cover and its north pole or south pole aligns with one of the preset magnetic induction points of the reed switch of the standard electric switch box, so as to switch on the reed switch and form a magnetic push-to-break switch. The reed switch 212 (FIGS. 17 and 25) in the standard electric switch box 21 and permanent magnet rod 32 in the permanent magnet rod switch box 3 (FIGS. 19 & 20) are both being fixed by a synthetic adhesive filled therein, and the dimensions of them are illustrated in the figures. According to the present invention, an effective magnetic induction switching of the standard electric switch box mounted below that door opening handle is realized by pulling the door opening handle equipped with the small permanent magnetic rod set from inside the cabin, wherein the reed switch in the standard electric switch box will be conducted twice owing to the back and forth movement of the small permanent magnetic rod set during the opening operation of the door.

The small permanent magnetic rod set 33 and the standard electric switch box 21 are mounted in such a manner that the reed switch 212 of the standard electric switch box remains unconnected inside when the door opening handle is not pulled and it will be flash connected twice inside when the door opening handle is pulled for opening the door, because the effective magnetic field/lines of the north or south pole of the small permanent rod 332 will sweep the standard electric switch box located thereunder for two times during the process. The small permanent magnetic rod set can also be mounted on other kinds of door opening handle based on the same principle. Further, the permanent magnetic rod could be extracted and mounted on other kinds of door opening handle in an adhesive manner but such door opening handle should not be influenced by the magnetic force thereof.

Figure 2:
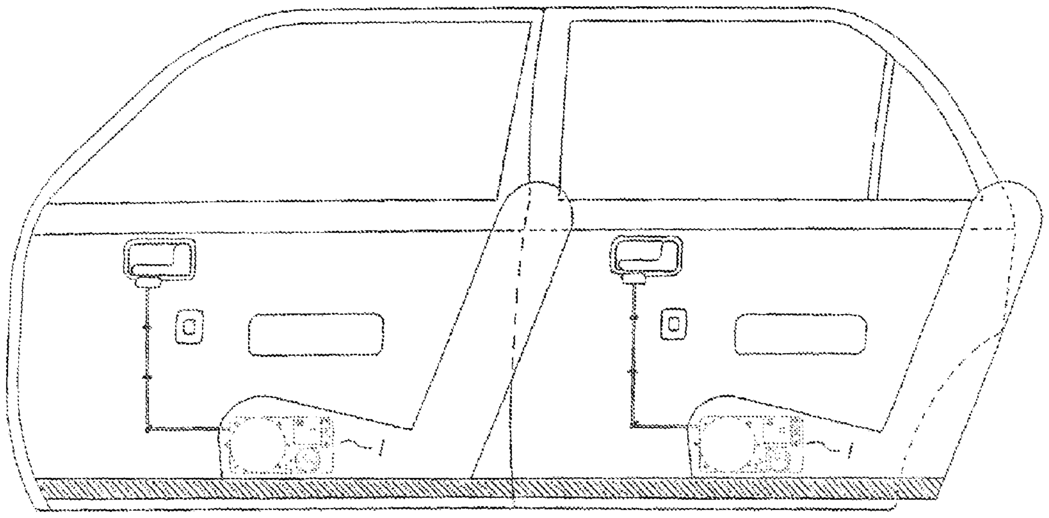
FIG. 2 is a lateral view showing a standard mounting position for the mainbody to avoid the installation of the safety cushion.

Preferably, the mainbody is mounted on a position of the car door sheltered by faced to the lower lateral side of the car seat as shown in FIG. 2 so that the passenger in a sideward collision accident will not be harmed by the mainbody. Alternatively, the mainbody could be mounted on other positions by incorporating a big safety cushion secured by velcro as shown in FIG. 1. The mainbody could be mounted on the door through four to six screw-fixing holes. If the mounting surface of the door is not flat, two screw-fixing holes in the middle part might be used instead (two screw-fixing holes of the main electric switch box could be used as the screw-fixing holes for the mainbody).

Figure 8:
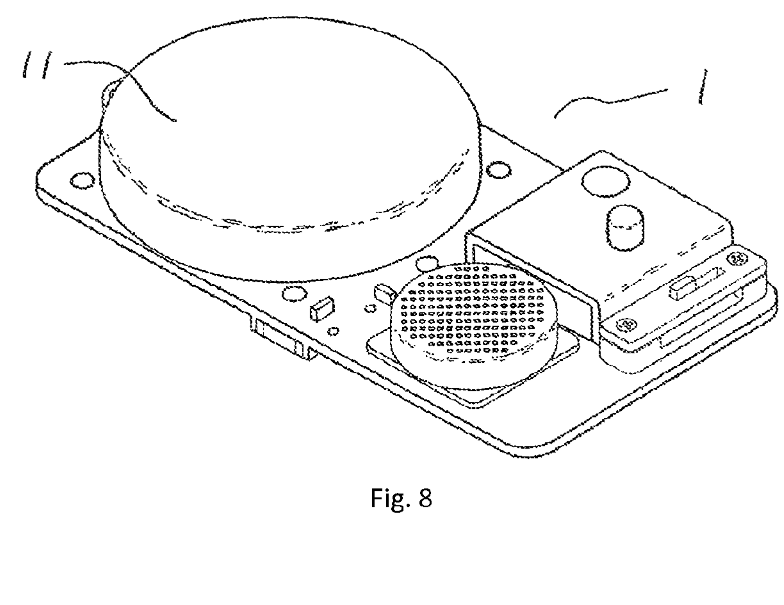
FIG. 8 is a schematic view showing the assembled mainbody.

At one side of the mainbody 1 the battery box 11 is arranged (FIG. 8), while the sound stopping button 161, the main electric switch box 5 and the sound generator box 12 are arranged on the other side. The battery box 11 comprises the cap 114, the battery compartment 111, and the circuit box 112, which is preferably a watertight box for ensuring that the circuit box will not be damaged by permeated rain water when it is exposed to or make contact with the rain in the raining day. In case the cap is not closed tight enough; the rain water might merely damage the battery.

According to the embodiment, there are six double wire cables extended from the watertight circuit box. The first cable 1121 passes through the battery box to the main electric switch box 5. The second cable 1122 passes through the battery box to the standard electric switch box 21 mounted below the door opening handle. The third cable 1123 passes through the battery box to the permanent magnet electric switch box 22 mounted on the door near the door edge. The fourth cable 1124 passes through the battery box to the loudspeaker 121 of the sound generator box 12. The fifth cable 1125 passes through the battery box to the permanent magnet push-to-break switch 16. These five cables pass through five slant holes and the gaps between each cable and respective holes are completely sealed by a leakproof adhesive. The sixth cable is connected to the 3V battery compartment 111. The battery box cap comprises an upper inner portion for preventing the battery cells from slipping out. According to another embodiment, an additional cable is arranged and extended from the watertight circuit box to pass through the battery box base for connection to the main battery of the automobile. Accordingly, the embodiment might further comprise a flash light 7 that works during the generation of the reminding sound, which is similar to the flash light of some conventional car theft prevention alarms.

According to the present embodiment, the first cable 1121 is connected to the main electric switch box 5 having a sideward push switch 53 for switching off the reminding sound. Its connection and position in the circuit can be varied because it is merely a switch for switching off the circuit.

Figure 27:
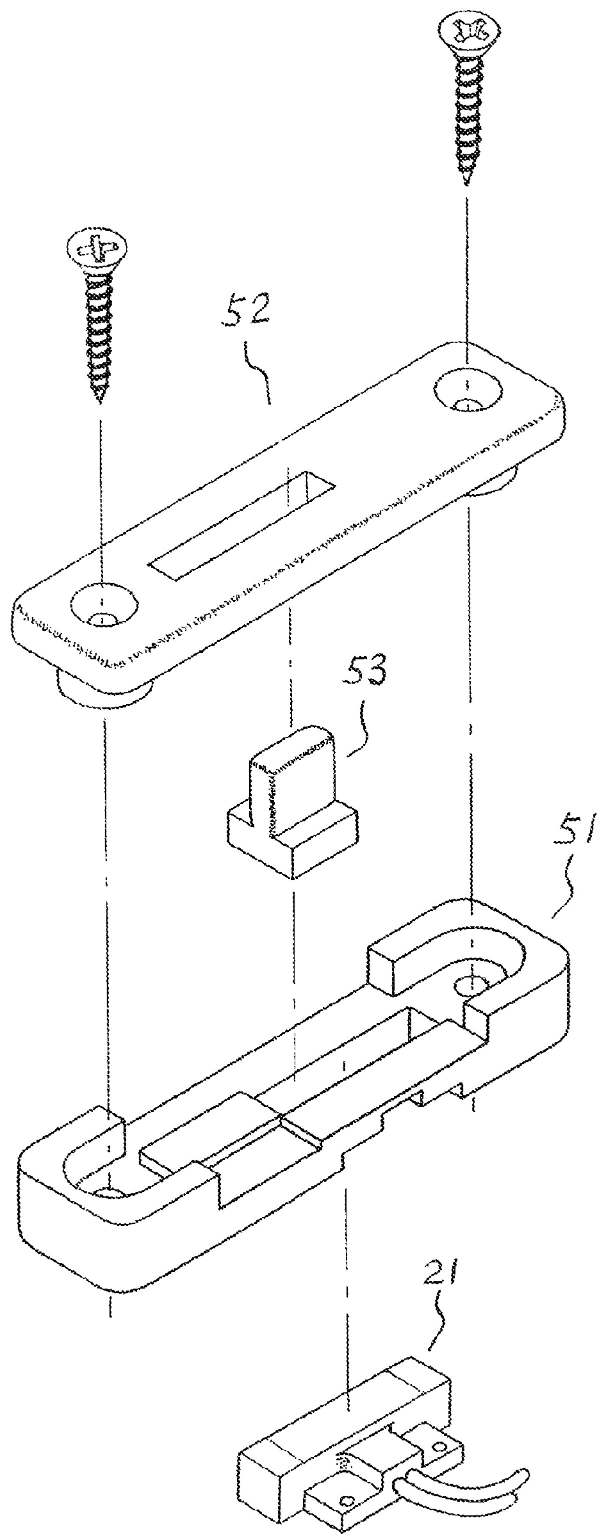
FIG. 27 is an exploded view of the main electric switch box.
Figure 28:
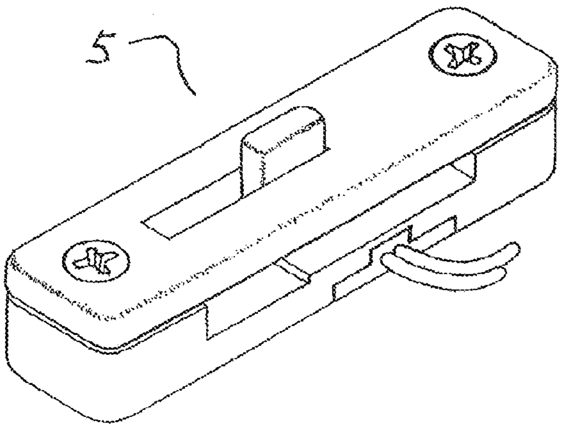
FIG. 28 illustrates the assembled main electric switch box.
Figure 29:
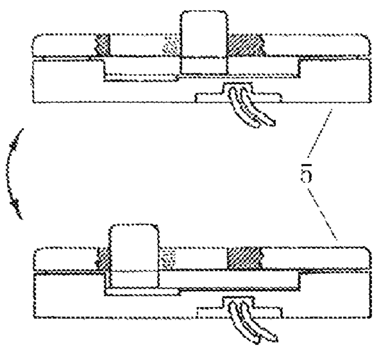
FIG. 29 illustrates the ON and OFF positions of the push switch of the main electric switch box.
Figure 30:
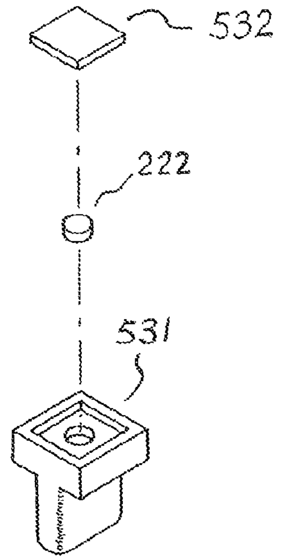
FIG. 30 is an exploded view of the push switch.
Figure 31:
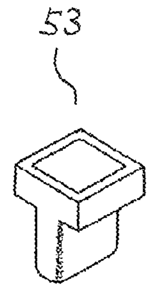
FIG. 31 illustrates the assembled push switch.

The main electric switch box 5 (FIG. 28) is an assemblage comprising the main switch base plate 51, the standard electric switch box 21, the main switch cover 52 and the push switch 53 (FIG. 27). The push switch comprises the small strong permanent magnet 222, the push switch housing 531 and the push switch cover 532 (FIG. 30). All these components are joined together by an ultrasonic adhesive or an industrial adhesive. There is a gap opening in the main switch cover 52 to form the track for the push switch. There is a narrow slightly protruded part in the middle of one side of the opening for fixing the push switch in either the ON or OFF position. When the push switch is moved to and locked at the middle of the main switch cover (FIG. 29), the permanent magnet 222 inside the sideward push switch 53 will result in the conduction of the reed switch of the standard electric switch box 21. If the push switch is moved to the end of the track of the main switch cover (FIG. 29), the reed switch will be switched off as the internal contacts of the reed switch will be separated in the absence of the magnetic force of the permanent magnet.

Figure 3:
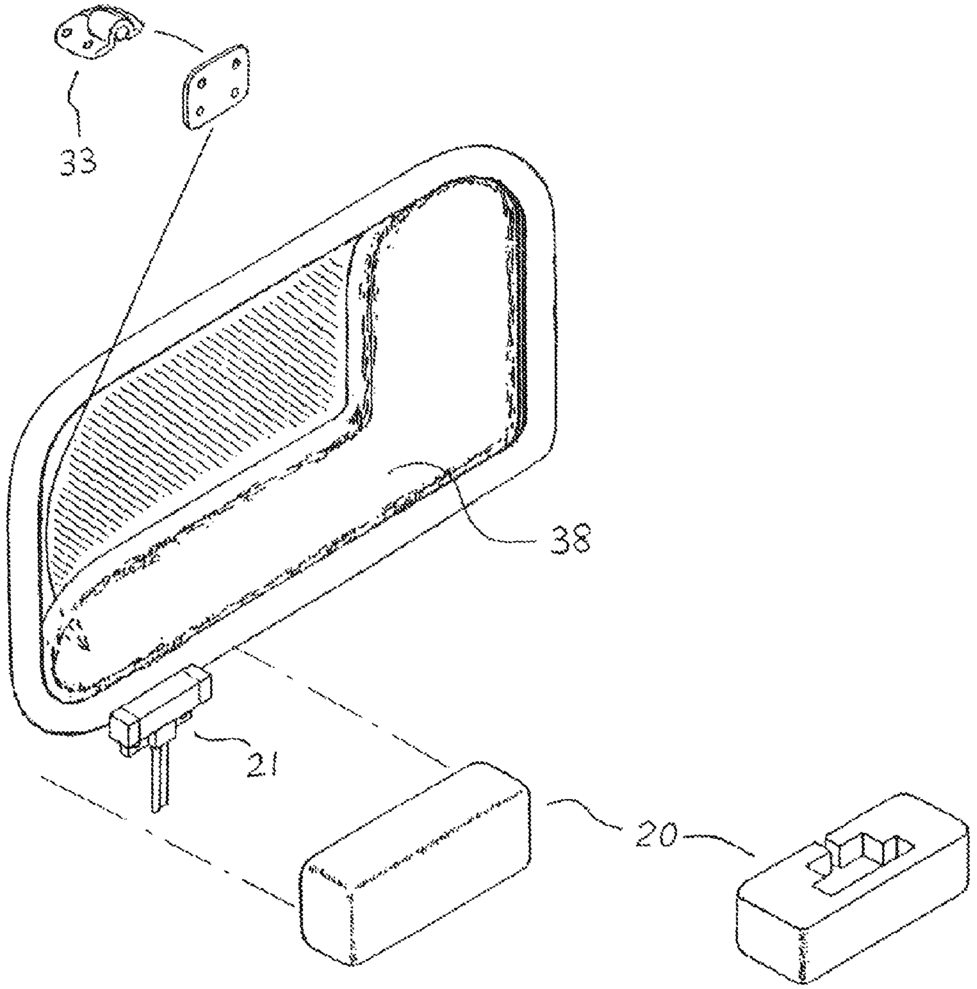
FIG. 3 is an exploded view showing the small permanent magnetic rod set mounted on the back of the door opening handle, and the standard reed switch box and the small safety cushion mounted below the door opening handle.
Figure 4:
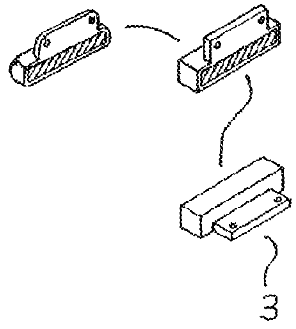
FIG. 4 is a schematic view showing a permanent magnetic rod box having round edges and corners.
Figure 5:
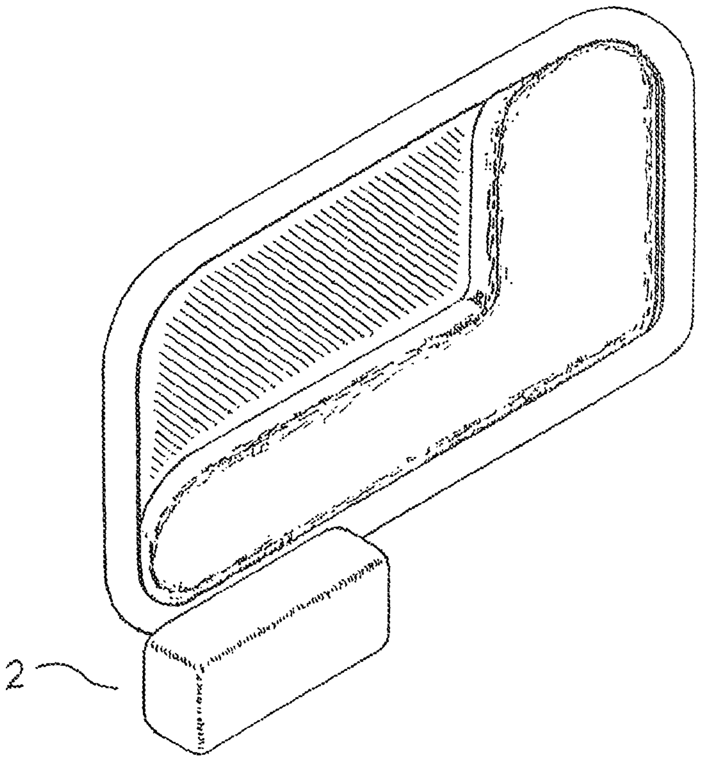
FIG. 5 is a schematic view showing an assembled permanent magnet reed switch box for replacing the standard reed switch box according to the third and fourth embodiments of the present invention.
Figure 6:
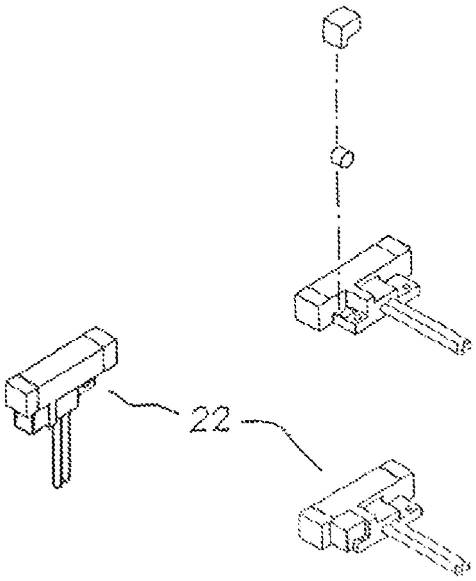
FIG. 6 is an exploded view showing the permanent magnet reed switch box.

The second cable 1122 is connected to the standard electric switch box 21 mounted below the door opening handle (FIG. 3).

The third cable 1123 is connected to the permanent magnet electric switch box 22 which comprises a reed switch box and a small permanent magnet 222 (FIG. 22) being fixed inside the magnet fixing cover 223 and having its north pole or south pole arranged to face the preset position at one end of the reed switch to be magnetically induced, so as to make the reed switch be always switched on in the absence of any other external magnetic field. The permanent magnet electric switch box is preferably mounted on the car door near the door edge; and in operation, its reed switch will be switched off by the opposite magnetic field from the correct pole of the strong permanent magnet 43 located within the effective distance therefrom (FIG. 42), whereby switching off the sound generator box and stopping the reminding sound. The permanent magnet electric switch box could be also mounted at other position adapted to realize similar electromagnetic switching effect with the strong permanent magnet 43, wherein the strong permanent magnet is provided with a color scale mark at one of its end faces for showing its polarity (north or south pole).

Figure 42:
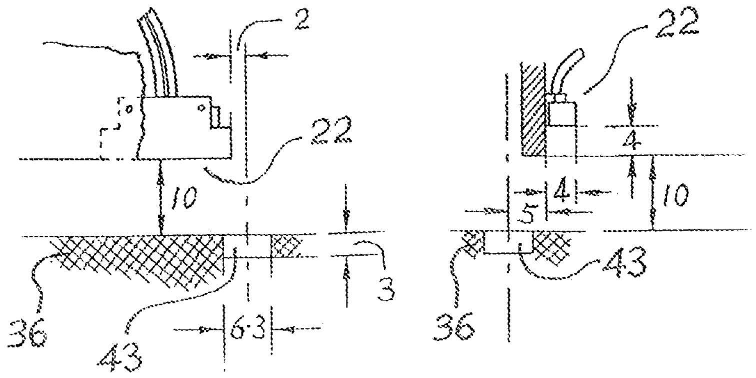
FIG. 42 is a partial sectional front view and side view of the mainbody mounted on the car door at a position closed to the car cabin floor. It shows the best position of the permanent magnet reed switch box to be magnetically induced by the magnetic field of the strong permanent magnet with the correct pole facing upwards.

The permanent magnet electric switch box 22 of the FIG. 42 is mounted on the bottom edge of the back of the mainbody, and the mainbody is positioned at a distance of about 10 mm from the cabin floor by a polyfoam piece 6, such that the permanent magnet electric switch box is also mounted at a distance of about 10 mm from the cabin floor.

The pole of the permanent magnet 43 facing upwards in FIG. 42 must be opposite to that of the small permanent magnet 222 facing the shown end of the reed switch of that permanent magnet electric switch box 22. In other words, if the pole of the end facing the reed switch of the small permanent magnet 222 is the north pole, then the pole of the permanent magnet 43 facing upward will be the south pole.

If the permanent magnet 43 is moved horizontally to close to the other end of the permanent magnet reed switch box, the distance between them remains unchanged, the inverted permanent magnet 43 with its opposite magnetic pole facing upward can produce the same magnetic induction effect. But the former installation method is preferable for avoiding unnecessary confusion.

Figure 7:
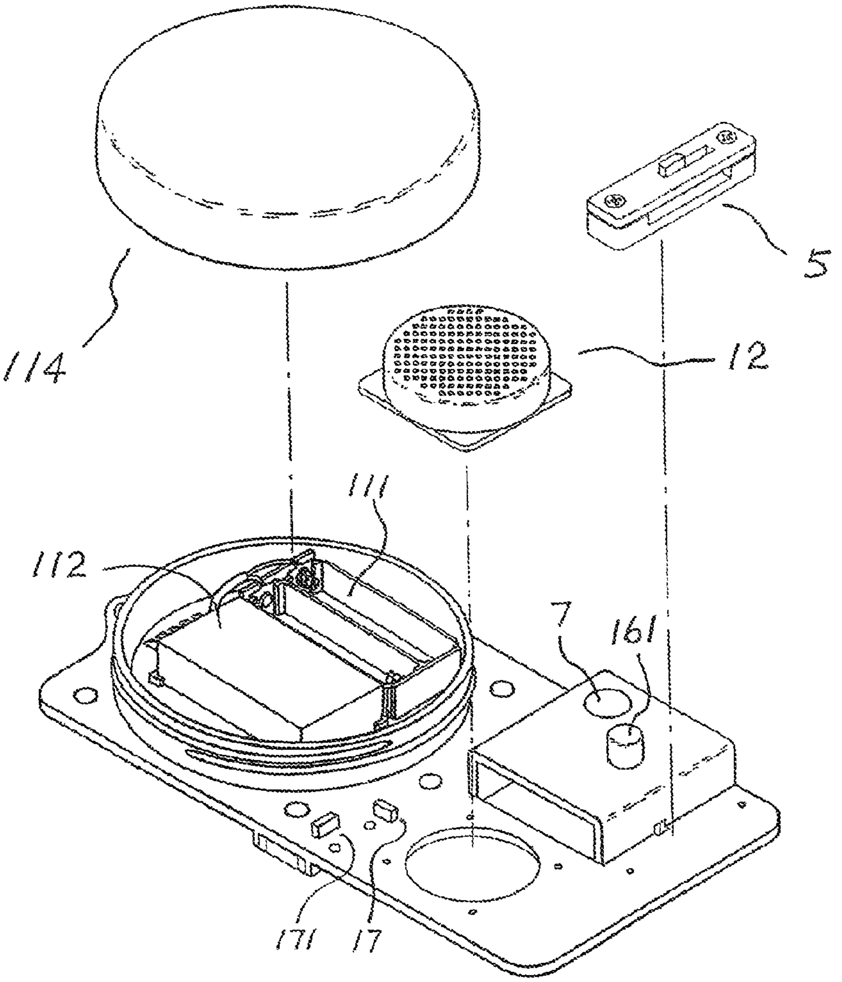
FIG. 7 is an exploded view of the mainbody.
Figure 43:
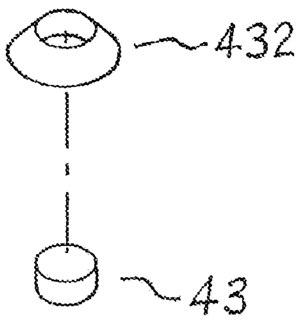
FIG. 43 is a schematic view showing the installation of a magnet protector around the strong permanent magnet.
Figure 44:
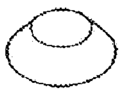
FIG. 44 is a schematic view showing the strong permanent magnet 43 enclosed by the magnet protector.
Figure 45:
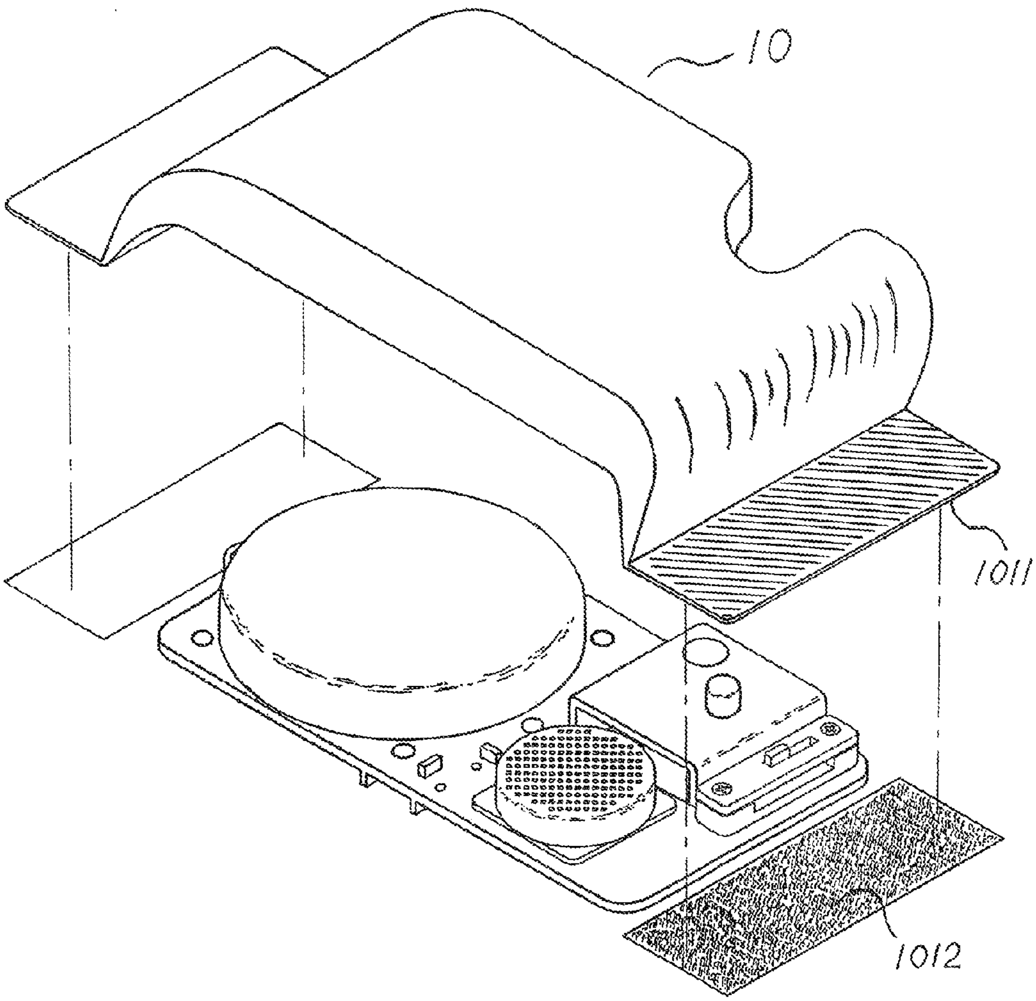
FIG. 45 is an exploded view of the mainbody and the safety cushion.
Figure 46:
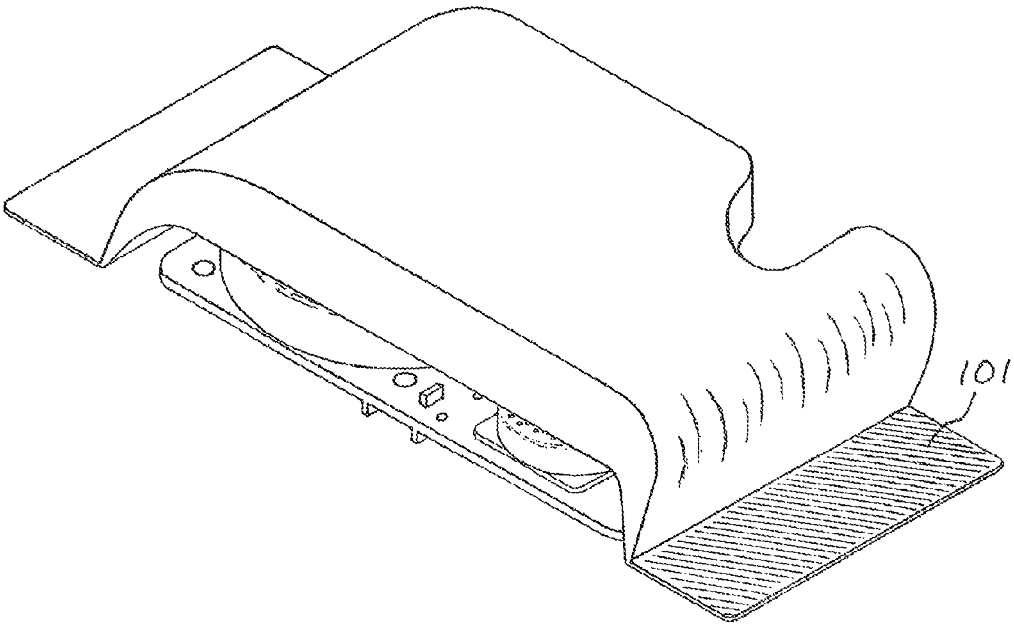
FIG. 46 is a schematic view showing the mainbody covered with the safety cushion.
Figure 47:
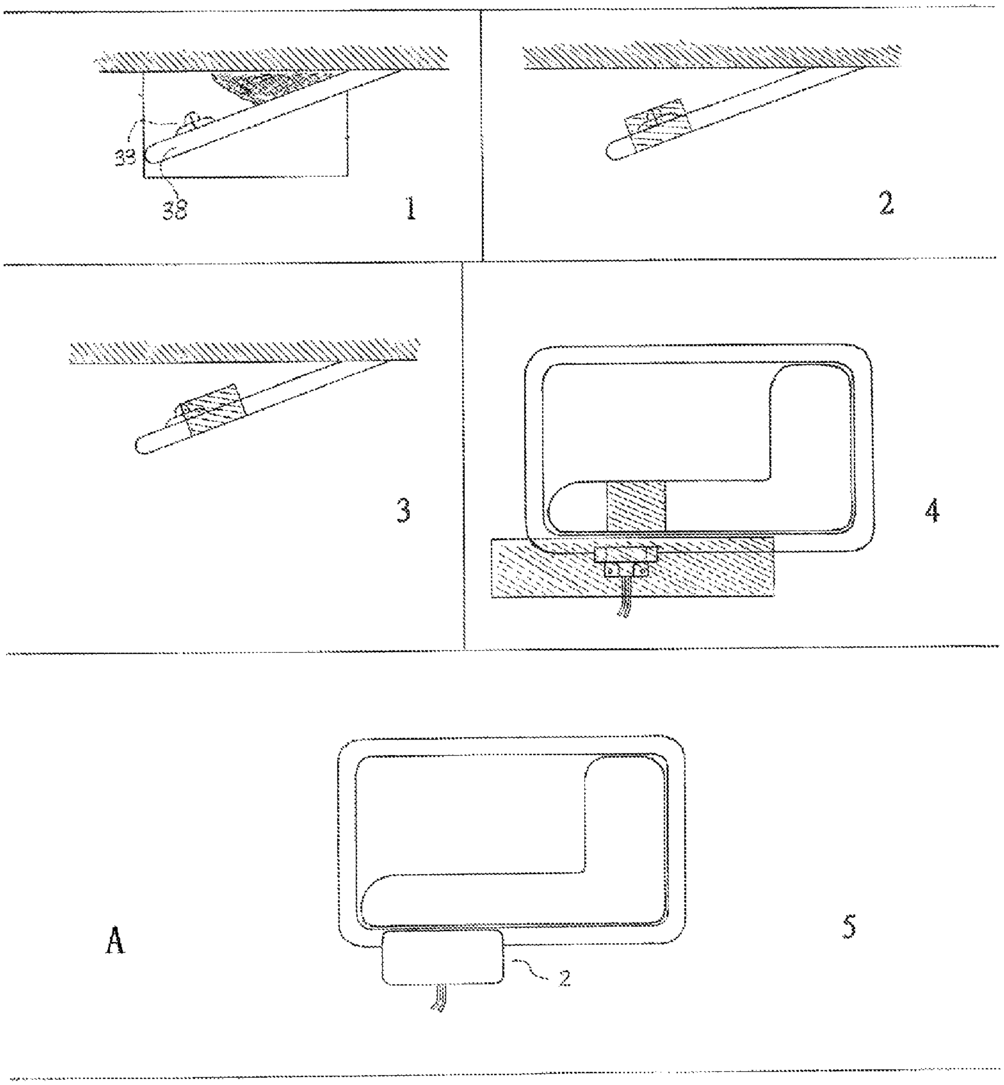
FIG. 47 illustrates the steps of mounting the small permanent magnetic rod set on the back of the door opening handle and mounting the standard reed switch box or the permanent magnet reed switch box below the door opening handle.
Figure 48:
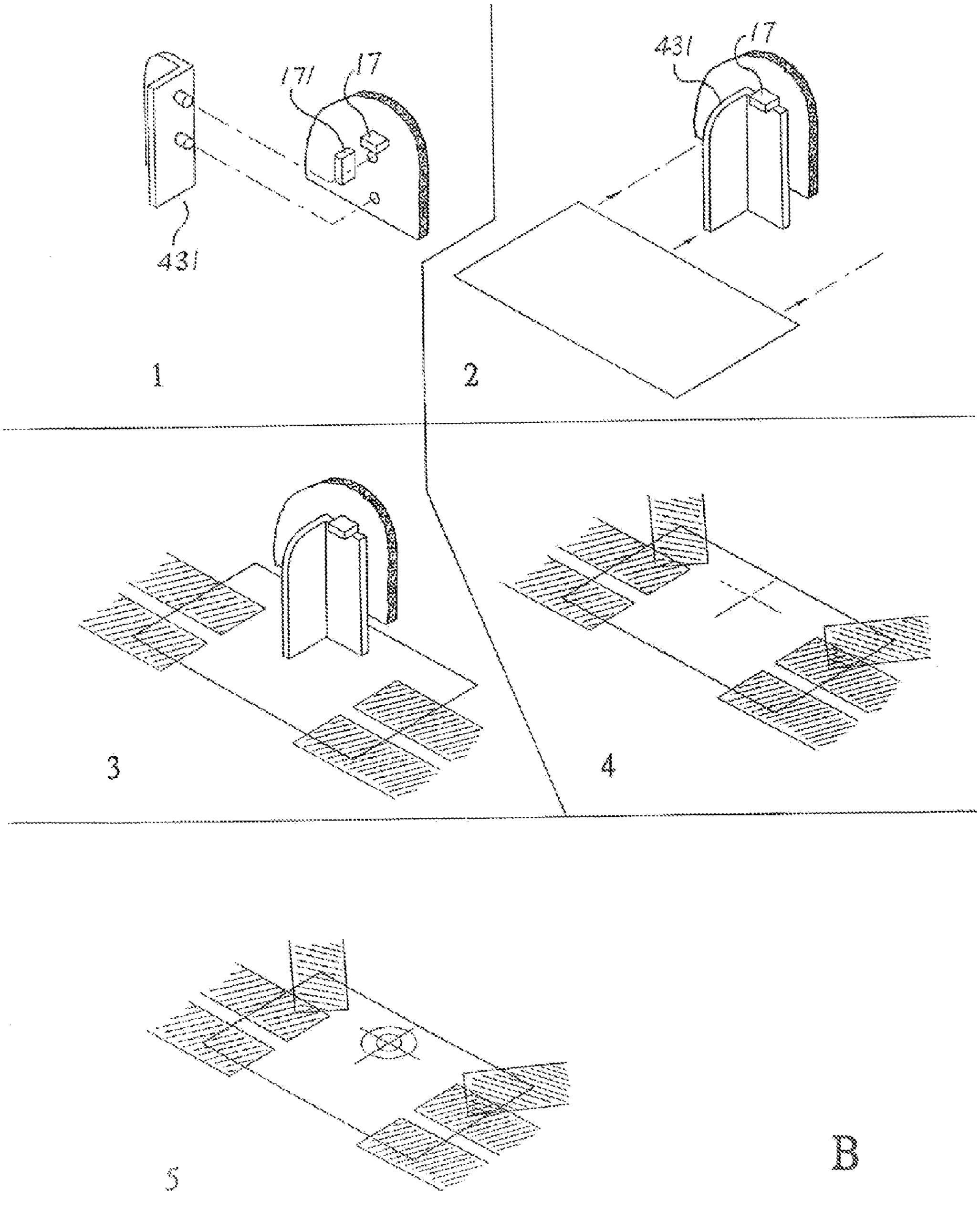
FIG. 48 illustrates the steps of mounting the strong permanent magnet at the cabin floor after mounting the mainbody on the car door close to the cabin floor.
Figure 49A:
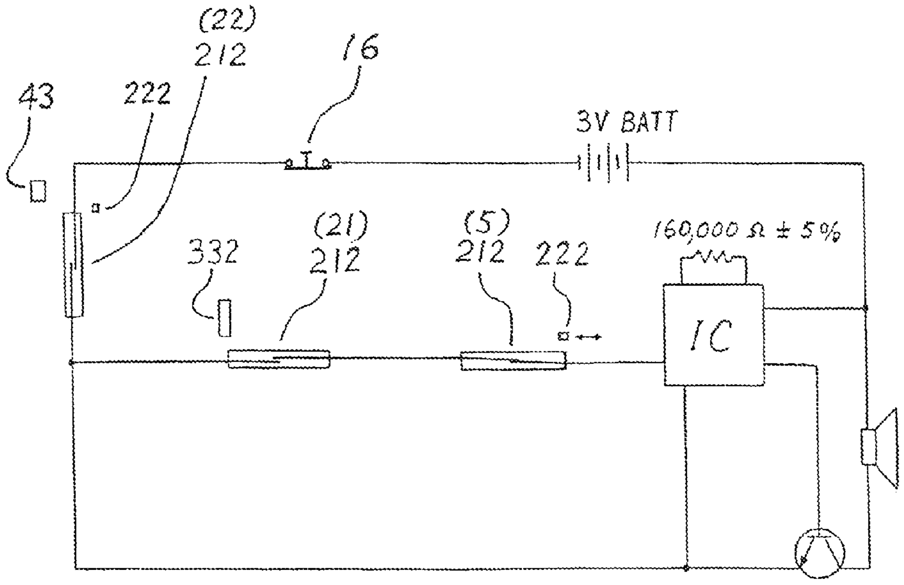
FIG. 49A illustrates the circuitry of the first embodiment of the present invention.
Figure 49B:
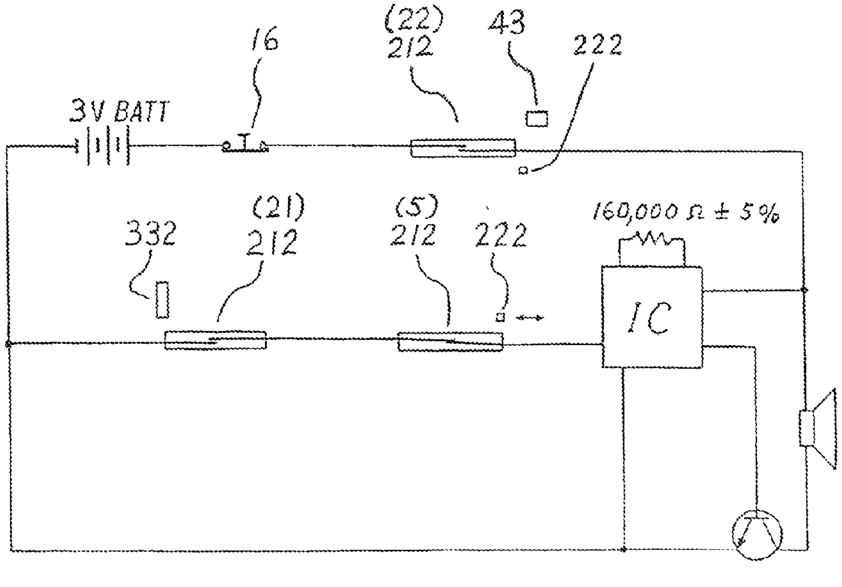
FIG. 49B illustrates the alternative circuitry of the first embodiment of the present invention.
Figure 50:
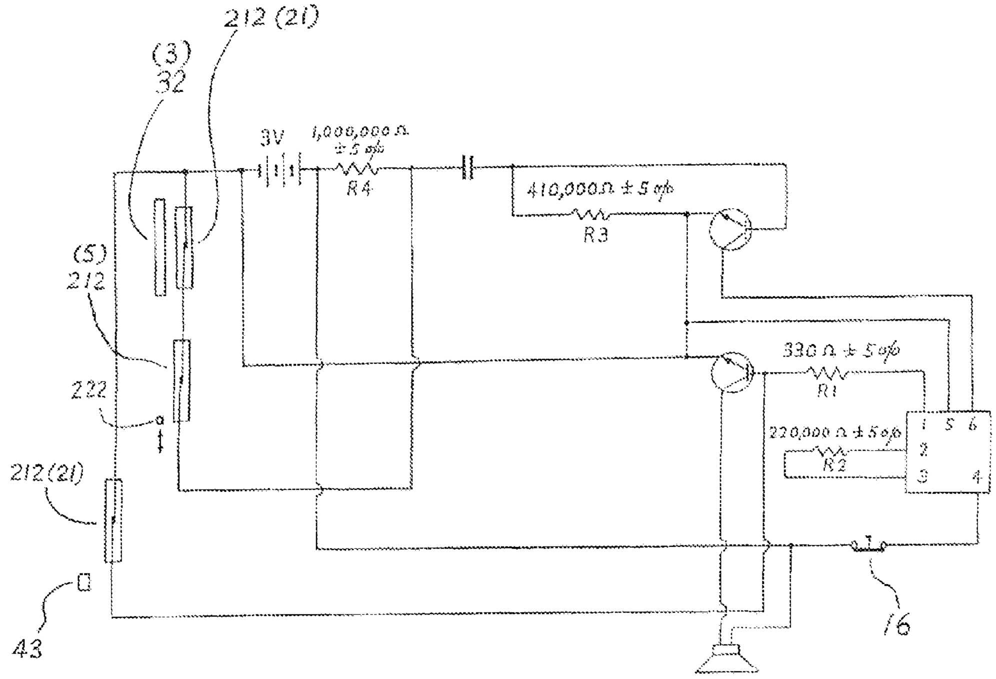
FIG. 50 illustrates the circuitry of the second embodiment of the present invention.

The two short pillars 17, 171 and the two holes (FIG. 7) in the middle, bottom part of the mainbody are made for matching with the magnet fixing piece 431 also comprising two pillars for insertion into the two holes (FIG. 48) for the fixing of the strong permanent magnet 43 at the car cabin floor. FIG. 42 shows the best, effective magnetic induction distance for the fixing. The permanent magnet 43 is allowed to deviate within 3 mm to right or left in the front view (left diagram). That permanent magnet is preferably only to be fixed within the indicated zone in the side view (right diagram). The permanent magnet 43 could be further provided with a magnet protector 432 (FIG. 43).

Figure 12:
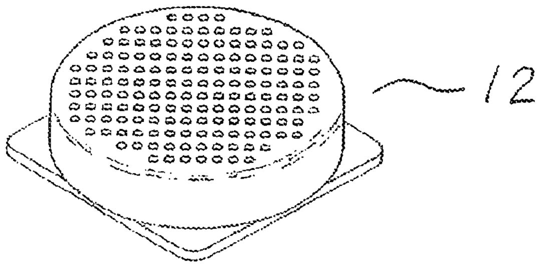
FIG. 12 is a schematic view showing the assembled sound generator box.

The fourth cable 1124 is connected to the sound generator box 12 (FIGS. 1, 7 & 12) comprising a waterproof loudspeaker, a box base and a removable box cap forming a space for receiving the waterproof loudspeaker; wherein the box base comprises gas permeable fence-like bars for enabling the cable to pass through and connect to the waterproof loudspeaker, and the box cap is provided with a plurality of pores for sound transmission and mounted with the box base in a screw-thread fit manner, a snap fit manner, a snug fit manner, or an adhesive manner, such that the box cap which is removable for easy clearing of the dirt as the dirt might prohibit the sound transmission therefrom.

Figure 13:
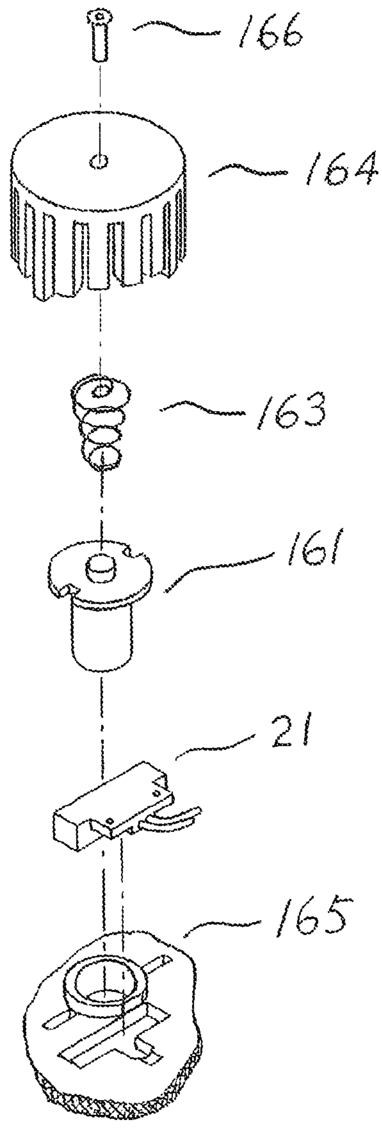
FIG. 13 is an exploded view of the permanent magnet push-to-break switch.
Figure 14:
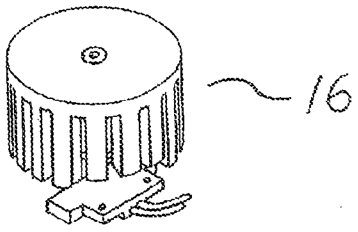
FIG. 14 illustrates the assembled permanent magnet push-to-break switch.
Figure 15:
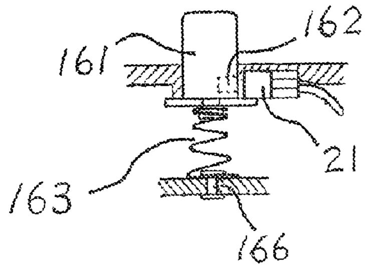
FIG. 15 is a sectional view of the permanent magnet push-to-break switch.
Figure 16:
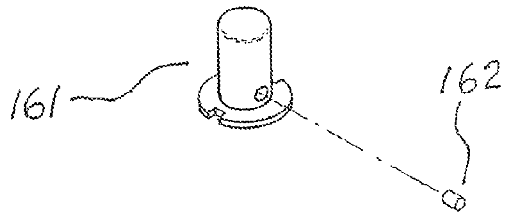
FIG. 16 is a schematic view showing the insertion of the strong permanent magnet into the sound stopping button.

The fifth cable 1125 is connected to the permanent magnet push-to-break switch, which is absolutely waterproof and comprises an upper part 165 having a plurality of recesses, a standard electric switch box 21, a sound stopping button 161, a small strong permanent magnet 162, a spring 163 and a supporting cover 164 for the sound stopping button; wherein a portion of the standard electric switch box is received in a first recess of the upper part, the spring is fixed by the supporting cover via the rivet 166 (FIG. 13), and the supporting cover is provided with two elongated pillars inserted into and positioned by another two second recesses of the upper part, and the sound stopping button is provided with a small hole for receiving the small strong permanent magnet and also provided with two notches at its brim for matching with inwardly thickened parts (not shown) of the two elongated pillars of the supporting cover for preventing the sound stopping button from rotating and enabling the small strong permanent magnet to be aligned with a preset magnetic induction point of the standard electric switch box (FIG. 15) under thrust of the spring, so as to form a magnetic enabled push-to-break switch; wherein the standard electric switch box is switched off as its magnetic induction being stopped by fully pressing the sound stopping button. After that button returns to its undepressed state, the next reminding sound will start from the beginning automatically. After pressing the button 161 of the push-to-break switch 16 to stop the reminding sound, it needs no another button pressing to restore the reminding function because the reminder will not be switched off by pressing the button 161.

There can be a flash light 7 (FIGS. 1, 7 and 9) that works during the generation of the reminding sound, which is similar to the flash light of some conventional car theft prevention alarms. Preferably, the flash light is connected to the main power source of the automobile.

The working principle of the present invention will be described below. When the passenger pulls the door opening handle from inside the car cabin, the effective, magnetic field of the small permanent magnetic rod set 33 from the door opening handle will sweep one of the two scale lines part of the standard electric switch box to cause a flash connection inside the reed switch. The connection is similar to the switch connection of a door bell of a room made by a visitor outside the room. Meanwhile, the car door is not yet opened or just slightly opened, so the reed switch of the permanent magnet switch box 22 near the car door edge is still influenced by the permanent magnet 43 and the circuit remains opened and the reminding sound cannot be released. But when the passenger pushes open the car door and releases the door opening handle which returns back to its original position, then the small permanent magnetic rod's effective magnetic field will sweep again the standard electric switch box and causes another flash connection inside the reed switch, the reminding sound is activated because the car door is opened wide enough for the reed switch of the permanent magnet electric switch box 22 to be magnetically induced and switched on again by its own permanent magnet 222.

Closing the door can stop automatically the reminding sound because the opposite magnetic field of the strong permanent magnet 43 overcomes the magnetic force of the small permanent magnet 222 again and disconnects the relevant reed switch therein. Pressing the button switch or sound stopping button 161 fully down can also stop the reminding sound at once. If the passenger inside the cabin wants to avoid the generation of the reminding sound while opening the door, the sound stopping button should be pressed down until the door is opened for a distance of 2 cm or above and the door-opening handle has returned to its original position. Also, the reminding sound can be switched off by pushing the sideward push switch 53 to the correct direction.

Second Embodiment

Figure 32:
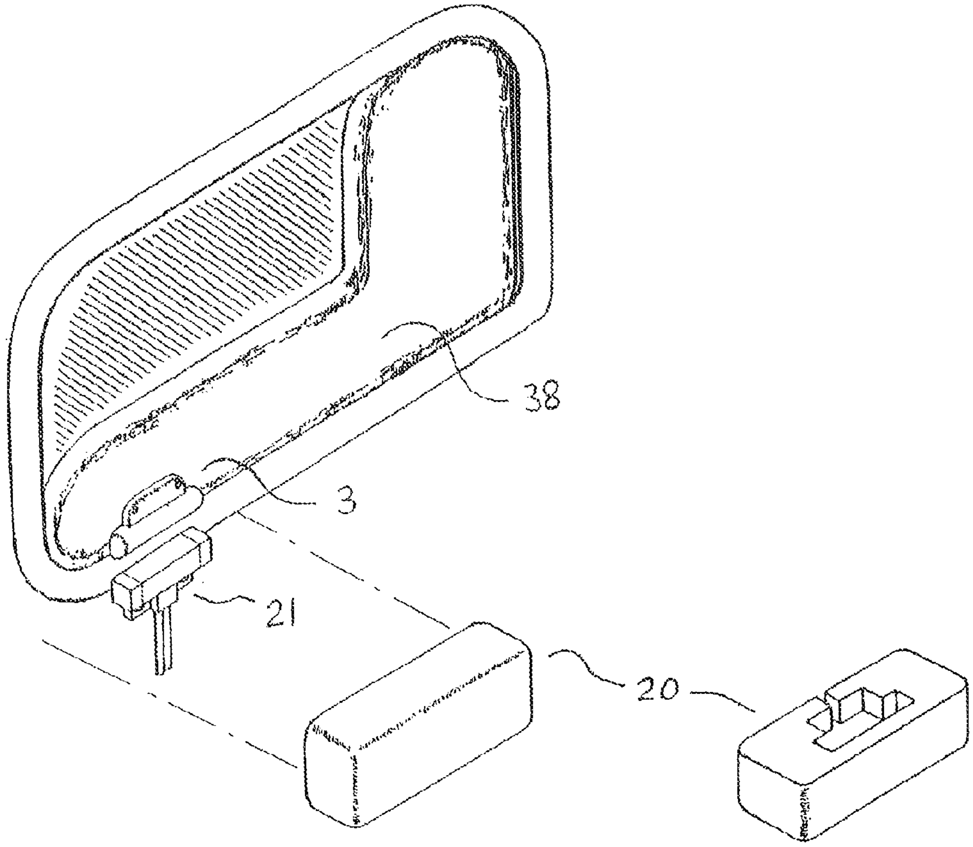
FIG. 32 illustrates the installation of the reed switch box, the permanent magnetic rod box and the safety cushion.
Figure 33:
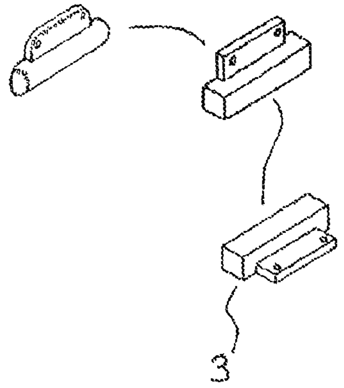
FIG. 33 illustrates the corners and edges of the permanent magnetic rod box can be blunt.
Figure 34:
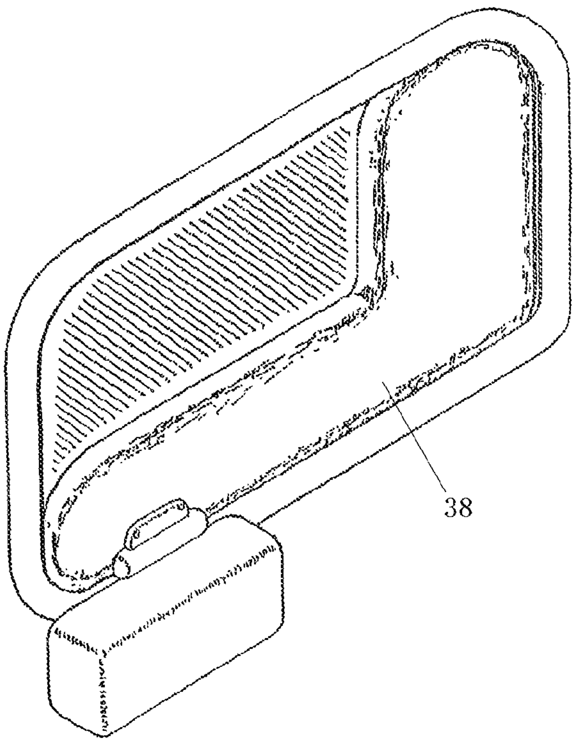
FIG. 34 is a schematic view of the door opening handle after assembling the parts shown in FIG. 32.
Figure 35:
FIG. 35 illustrates the rubber clip.
Figure 36:
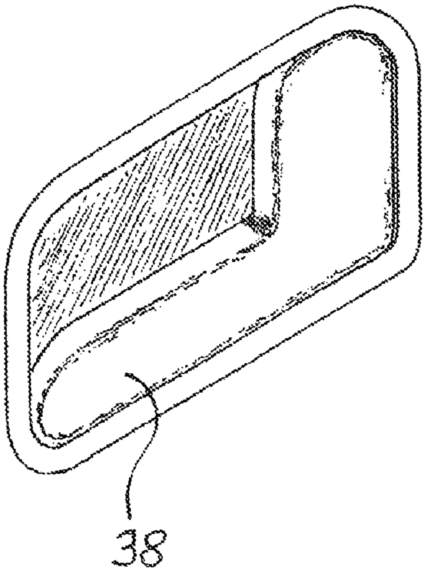
FIG. 36 illustrates the door opening handle inside the car cabin.

The present embodiment adopts a reed switch or magnetic switch type door opening reminder circuit (FIG. 50), and it differs from the first embodiment in that the small permanent magnetic rod set is selectively replaced by a permanent magnetic rod box 3, either of which could be mounted on the front part of the door opening handle inside the car cabin (FIGS. 32 & 34). The relevant first standard electric switch box 21 is mounted on the car door within 8 mm thereunder. Another small safety cushion can be mounted to shelter the permanent magnetic rod box. The installation of the permanent magnetic rod box 3 could make reference to the same of the small permanent magnetic rod set 33 of the first embodiment.

Figure 41:
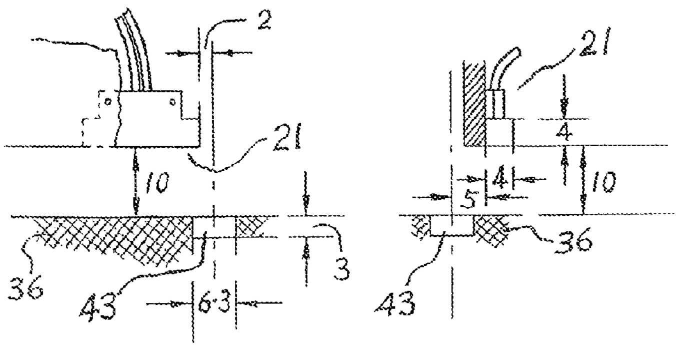
FIG. 41 is a partial sectional front view and side view of the mainbody mounted on the car door at a position closed to the car cabin floor. It shows the best position of the standard reed switch box to be magnetically induced by the magnetic field of the strong permanent magnet.

According to the present embodiment, there are two connection points in the circuit capable of stopping the reminding sound when they are connected; and the reminding sound will be generated when they are disconnected, and a lasting or continuous connection of them will not consume power. The second standard electric switch box 21 (FIG. 41) of the present embodiment mounted on the car door edge for switching by the permanent magnet 43 utilizes the effect of the connection points. In FIG. 41, the permanent magnet 43 is allowed to deviate within 3 mm to right or left in the front view (left diagram). That permanent magnet is preferably to be fixed within the indicated zone in the side view (right diagram). The mounting method is similar to that of the first embodiment, but the polarity of the permanent magnet 43 can be either north or south.

The working principle and the implementation of supplementary function 1 is similar to that of first embodiment. As to the supplementary function 2, the sound stopping button should be pressed until the door is opened for a distance of 2 cm or above, and there is no need to wait the door-opening handle to return to its original position.

Third Embodiment

Figure 51:
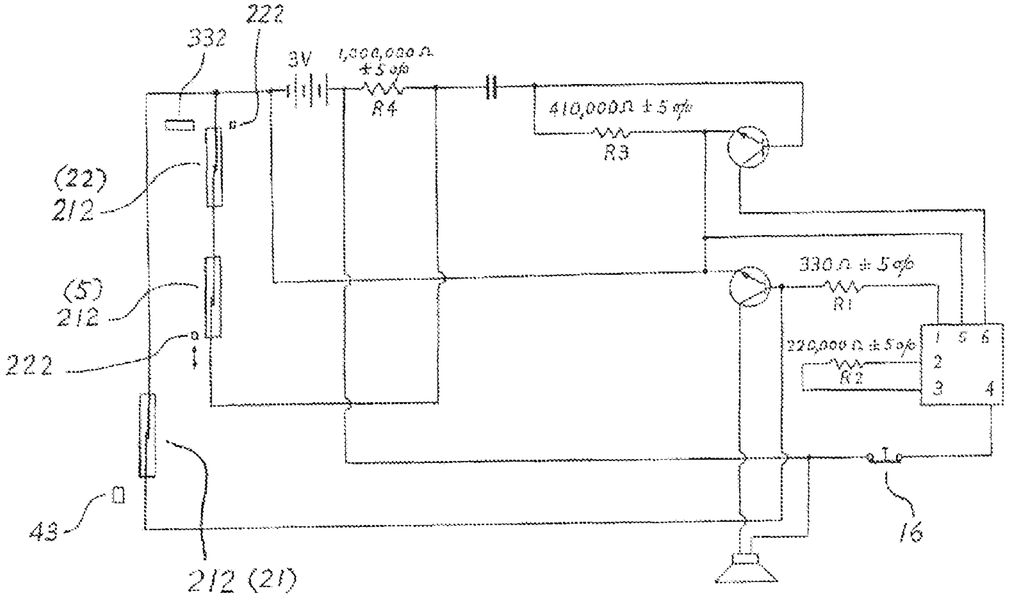
FIG. 51 illustrates the circuitry of the third embodiment of the present invention.

The present embodiment makes use basically the same circuitry as the second embodiment, as shown in FIG. 51. The small permanent magnetic rod set 33 mounted on the back of the door opening handle is similar to that of the first embodiment. But the electric switch box mounted below the door opening handle is a permanent magnet electric switch box 22 rather than a standard electric switch box 21. The small permanent magnetic rod set has its magnetic pole facing downwards to oppose the magnetic induction caused by the small permanent magnet 222 that makes the permanent magnet electric switch box 22 to be constantly switched on. The requirement or manner for setting the orientation of their poles is similar to that of the permanent magnetic reed switch box mounted near the door edge of the first embodiment.

The small permanent magnet 222 of the permanent magnet electric switch box 22 mounted below the door opening handle makes the relevant reed switch connected inside as long as the door opening handle is not pulled for opening the door. But when the handle is pulled for opening the door, the magnetic field of the small permanent rod set 33 will cause a flash disconnection inside the relevant reed switch thereof. The disconnection activates the circuit in a manner similar to that made by pulling the door opening handle of the second embodiment. Although the effective magnetic field of the small permanent magnetic rod set will sweep the relevant permanent magnet electric switch box twice, the effect will remain unchanged.

The standard electric switch box 21 and the strong permanent magnet 43 fixed near the car door edge is entirely similar to that of the second embodiment. The circuit activation and deactivating of both embodiments are also similar. But the function 2 has to be implemented in a manner as disclosed by the first embodiment, because the effective magnetic field of the small permanent magnetic rod set will sweep across the permanent magnet electric switch box again when the door opening handle returns to its original position.

Fourth Embodiment

Figure 52:
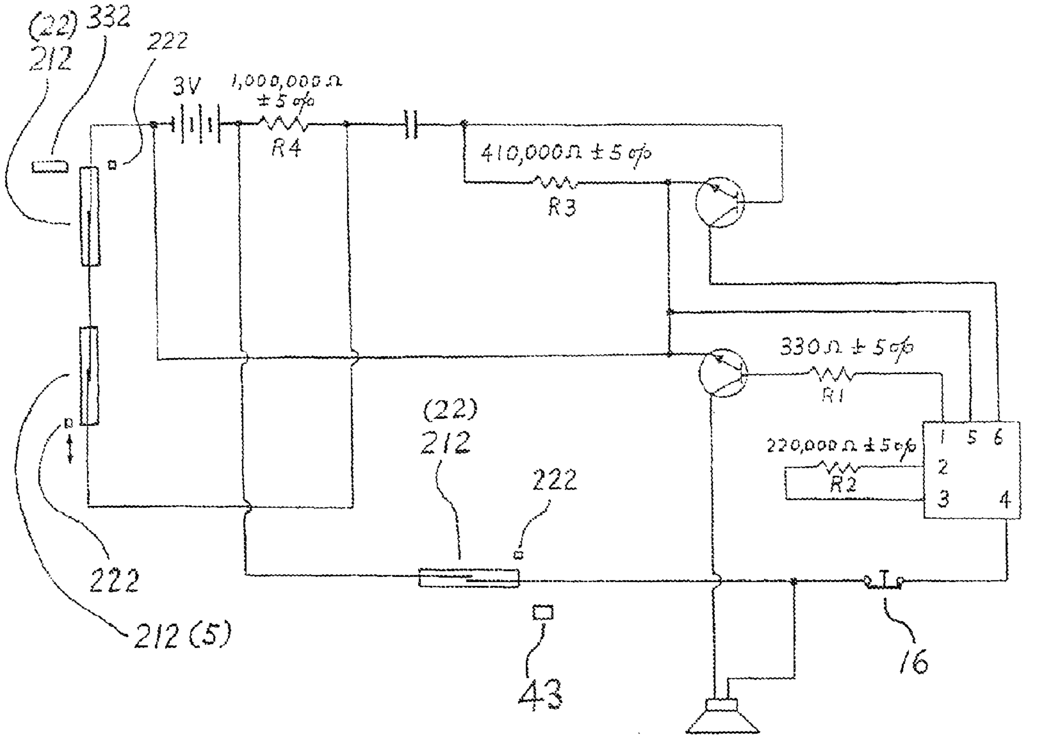
FIG. 52 illustrates the circuitry of the fourth embodiment of the present invention.

Although the present embodiment uses a circuitry basically equivalent to the same of the second embodiment or the third embodiment, there is a little change in the connection of the circuitry. The configuration or mounting of switches around the door opening handle is entirely similar to that of the third embodiment. They differ in that a magnetic push-to-break switch, namely the permanent magnet electric switch box 22, is connected in series with the permanent magnet push-to-break switch 16 (FIG. 52). It also removes the standard electric switch box 21 from the circuitry. The permanent magnet electric switch box 22 connected in series with the permanent magnet push-to-break switch 16 is mounted near the door edge of the automobile, the permanent magnet 43 fixed at the cabin floor is used for deactivating or switching off the reminding sound. The working mechanism of the switching is completely identical to that of the first embodiment.

When the door opening handle is pulled from inside of the cabin for opening the door, the effective magnetic field of the small permanent magnet set 33 passes the first permanent magnet electric switch box arranged near the handle for two times. The first passing cannot activate the reminder because the door is still not opened and the circuit is kept open by the second permanent magnet electric switch box located at the door edge. The second or return passing activates the reminding sound because the door is opened wide enough for the small permanent magnet 222 of the second permanent magnet electric switch box to connect respective reed switch by magnetic induction.

The present embodiment is better than the second embodiment or third embodiment in terms of energy saving because the circuitry is deactivated or switched off immediately as the door is closed. It is different from the case of the second embodiment or third embodiment where the circuitry is still in an activated state when the door is closed until the end of the generation of the reminding call.

The function 2 of the present embodiment is realized in the similar manners as the first embodiment or third embodiment.

Figure 37:
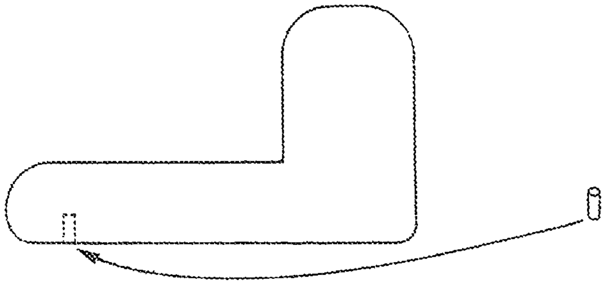
FIG. 37 illustrates that the small permanent magnetic rod can be fixed inside the door opening handle.

In view of the foregoing embodiments, if the reminder of the present invention is embedded or preinstalled in future automobiles, it might be completely hidden inside the car door and exposing merely a push button and a sideward push button. For example, the small permanent magnetic rod set 33 could be arranged inside the door opening handle as shown in FIG. 37, and the standard electric switch box or the permanent magnet electric switch box could be concealed in an appropriate position under the door opening handle.

The two push buttons can be located near the door opening handle inside the cabin for conveniently carrying out the supplementary functions 1 and 2 to stop and avoid the generation of the reminding sound. Preferably, the reminder could be driven by the internal battery of the automobile (step down operation might be required). A flash light can also be incorporated, which might operate during the generation of the reminding sound in the same manner as the conventional car theft prevention alarm.

When the present invention is embedded in the automobile, only the sound stopping button of the permanent magnet push-to-break switch and the push switch of the main electric switch box will be exposed, whereby the present invention can stand the most extreme weather temperature and is waterproof, and it will not ignite any inflammable gas possibly existed in its surroundings.

Fifth Embodiment

Many taxis are provided with apparatus for enabling the driver to open and close the door by pressing respective buttons. If the present invention is employed on such taxis, an extra device operated by the driver is needed. The circuit of the device (FIG. 53) is switched on by the switch 201 as the taximeter starts. The circuit is adapted from a conventional domestic door bell music box, just like the circuit of the first embodiment, but the connection manner of respective switches is different.

Figure 53:
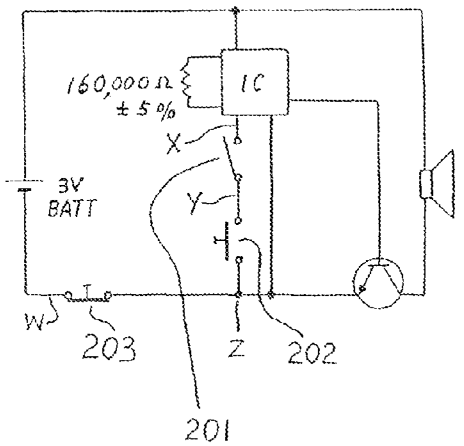
FIG. 53 illustrates the circuitry of the fifth embodiment of the present invention.

Before the passenger enters into the cabin, the reminding sound will not be generated when the driver push the switch to open the door. After the passenger enters into the cabin, the circuit is switched on as the driver starts the taximeter and presses another electric switch 201 (FIG. 53). When the taxi arrives the destination and the passenger has paid the fare, the driver will press the switch to open the door. As the switch is attached to the push-to-make switch 202 and the circuit is still switched on (though the taximeter will stop running), the reminding sound will be activated by the switching and opening of the door. When the driver press switch to close the door, it will trigger simultaneously a push-to-break switch 203 to stop the reminding sound. The taximeter is then returned to the unhired position and the circuit and the sound generator will be switched off.

Figure 39:
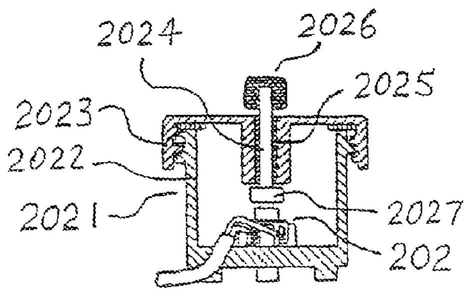
FIG. 39 is a sectional view of the push-to-make switch inside a cylindrical container with a screwing cap.
Figure 40:
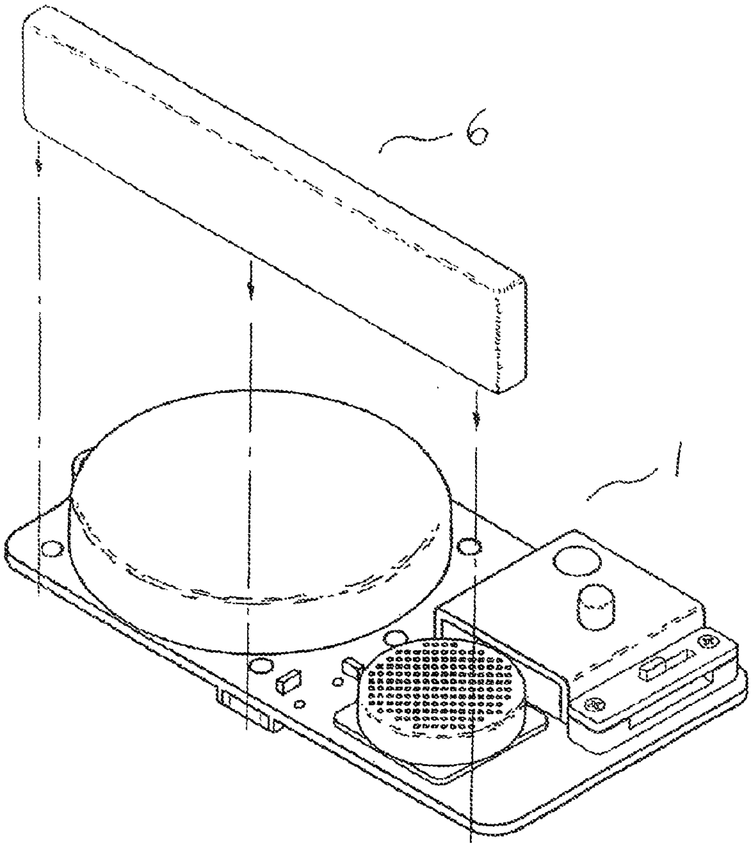
FIG. 40 illustrates a polyfoam piece provided for mounting the mainbody on the car door at a fixed distance of 9-10 mm above the car cabin floor.

The present embodiment is provided with a mechanism to prevent the switching device from igniting inflammable gas probably existed in its surroundings. The push-to-make switch 202 can be sheltered in the base centre of a cylindrical container 2021 (FIG. 39), which is covered by a screwing cap 2023. A shaft 2024 is extending through centre bearing tube 2025 of the cap to the button switch of the push-to-make switch. The shaft is fixed by a ring 2027. A switch button 2026 is fixed on the top of the shaft. The ring 2027 and the button 2026 hold the shaft in-between the screwing cap 2023 in such a manner that the shaft is enabled to move up and down over a small range of distance. When the box is screwed tight, pressing the button 2026 makes the push-to-make switch to be pressed at the same time. The minute and extremely small spark produced by switching the push-to-make will not ignite any inflammable gas probably existed in its surroundings.

Figure 38:
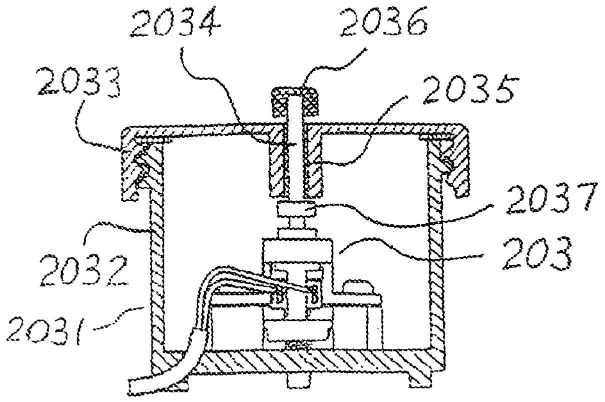
FIG. 38 is a sectional view of the push-to-break switch inside a cylindrical container with a screwing cap.

Similarly, the push-to-break switch 203 of the device is sheltered in a bigger cylindrical container 2023 (FIG. 38). As the construction of both boxes is similar, so the switching operation of the push-to-break switch also will not ignite the inflammable gas.

The device is basically a sound generator box with the circuitry as shown in FIG. 53. The power might come from the taxi battery. It should be mounted in a safe place in the taxi cabin and provide clear reminding sound. There are two double-wired cables, which pass through the sound generator box to connect to those two cylindrical containers in which the push-to-make switch and push-to-break switch is received respectively. The first cable is connected to the position X and Z of the circuit and then connected to an ordinary electric switch 201 connected and activated simultaneously with the taxi meter and the push-to-make switch 202 in serial connection with the electric switch and also connected and activated simultaneously with the door opening button. The push-to-make switch sheltered in a smaller cylindrical container is connected to the position Y and Z of the circuit. It is attached to the door opening switch so that the opening of the car door will activate the sound generator box simultaneously. The second cable is connected to the position W and Z of the circuit and then connected to a push-to-break switch sheltered in a bigger cylindrical container. Its button switch is attached to the door closing switch so that the closing of the door will break the circuit and stops the reminding sound.

The first embodiment to fourth embodiment employ permanent magnet push-to-break switches, while the fifth embodiment employ ordinary push-to-break switch and also push-to-make switch enclosed in respective sealed cylindrical containers, as the moving space required by the sound stopping button or operation of the fifth embodiment is much less than that of the first four embodiments, the installation of the same will be thus relatively easy.

The foregoing embodiments are not intended to limit the protection scope of the technical solutions thereof, and any modification, equivalent substitution and improvement made without departing from the spirit and principle of the foregoing embodiments shall all fall within the protection scope of the technical solutions provided hereinbefore.

What is claimed is:

1. A hand luggage reminder for use in an automobile comprising a mainbody (1) operationally connected with a first and a second electric switch boxes (21, 22), a small permanent magnetic rod set (33), and a strong permanent magnet (43); and the mainbody further comprises a main electric switch box (5) operationally connected with a battery box (11), a sound generator box (12), and a permanent magnetic push-to-break switch (16) for controlling and switching the sound generator box; wherein the mainbody is embedded into a door of the automobile or arranged on an outer surface of the door inside the automobile, and the small permanent magnetic rod set is mounted at a front side or a back side of a door opening handle (38) and cooperated with the first electric switch box arranged below the door opening handle such that a reminding sound is generated via switching on the sound generator box when the door is opened by pulling the door opening handle, and the strong permanent magnet is arranged along an edge of a door frame or on a cabin floor (36) of the automobile and cooperated with the second electric switch box arranged on the door at a position near the edge of the door frame or a bottom edge of the mainbody such that the reminding sound is stopped via switching off the sound generator box when the door is closed.

2. The hand luggage reminder according to claim 1, wherein the small permanent magnetic rod set comprises a small permanent magnetic rod holder and a permanent magnetic rod, wherein the small permanent magnetic rod holder is provided with a color scale line; the first electric switch box is a standard reed switch box comprising a box body and a reed switch, wherein each of both sides of the first electric switch box is provided with a color scale line for indicating a preset magnetic induction point and facilitating its positioning in relation to the color scale line of the small permanent magnetic rod set; and the second electric switch box is a permanent magnet reed switch box, which is a standard reed switch box further comprising a permanent magnet and a magnet fixing cover, wherein the permanent magnet is fixed by the magnet fixing cover and its north pole or south pole aligns with one of the preset magnetic induction points of the standard reed switch box, so as to switch on the reed switch and form a magnetic push-to-break switch; and the strong permanent magnet is provided with a color scale mark at one of its end faces for showing its polarity and facilitating its installation, such that the polarity of the one of its end faces of the strong permanent magnet facing an end face of the second electric switch box enables a predetermined electromagnetic switching action in the second electric switch box.

3. The hand luggage reminder according to claim 2, wherein the first electric switch box and the second electric switch box both are a standard reed switch box; or the first electric switch box is a permanent magnet reed switch box and the second electric switch box is a standard reed switch box; or the first electric switch box and the second electric switch box both are a permanent magnet reed switch box.

4. The hand luggage reminder according to claim 1, wherein the permanent magnet push-to-break switch comprises an upper part (165) having a plurality of recesses, a third electric switch box, a sound stopping button (161), a small strong permanent magnet (162), a spring (163) and a supporting cover (164) for the sound stopping button; wherein a portion of the third electric switch box is received in a first recess of the upper part, the spring is fixed by the supporting cover, and the supporting cover is provided with two elongated pillars inserted into and positioned by another two second recesses of the upper part, and the sound stopping button is provided with a small hole for receiving the small strong permanent magnet and also provided with two notches at its brim for matching with inwardly thickened parts of the two elongated pillars of the supporting cover for preventing the sound stopping button from rotating and enabling the small strong permanent magnet to be aligned with a preset magnetic induction point of the third electric switch box under thrust of the spring, so as to form a magnetic enabled push-to-break switch; wherein the third electric switch box is switched off as its magnetic induction being stopped by fully pressing the sound stopping button, such that the reminding sound is stopped as the sound generator box is switched off.

5. The hand luggage reminder according to claim 1, wherein the mainbody is arranged at a position of the door corresponding to a lower lateral side of a seat of the automobile, wherein a safety cushion is arranged at outside of the mainbody and/or the first and the second electric switch boxes.

6. The hand luggage reminder according to claim 1, wherein the sound generator box (12) comprises a waterproof loudspeaker, a box base and a box cap forming a space for receiving the waterproof loudspeaker; wherein the box base comprises fence-like bars for enabling a cable connection of the waterproof loudspeaker, and the box cap is provided with a plurality of pores for sound transmission and mounted with the box base in a screw-thread fit manner, a snap fit manner, a snug fit manner, or an adhesive manner.

7. The hand luggage reminder according to claim 1, wherein the battery box (11) comprises a watertight circuit box (112) in which a battery compartment (111) is enclosed, wherein the watertight circuit box (112) is respectively in cable connection with the main electric switch box (5), the first electric switch boxes (21), the second electric switch boxes (22), the sound generator box (12), the permanent magnetic push-to-break switch (16), and the battery compartment (111); wherein the battery box (11) further comprises a cap (114) having an upper portion for preventing displacement of a battery arranged in the battery compartment (111).

8. The hand luggage reminder according to claim 1, wherein the main electric switch box (5) comprises a main switch base plate (51) connected with a forth electric switch box, a main switch cover (52) and a push switch (53); wherein the push switch comprises a push switch housing (531) connected with a permanent magnet (222) and a push switch cover (532); wherein an upper portion of the main switch cover is provided with an opening forming a guide slot for displacement of the push switch and a narrow slightly protruded part at one side of the opening for fixing the push switch in a predefined position; and the main electric switch box is in electric connection with a circuit box inside the battery box.

9. The hand luggage reminder according to claim 1, further comprising a switch control device; wherein the automobile is a taxi comprising a taxi meter, a door opening button, and a door closing button; and the switch control device comprises a main sound box in operational connection with an electric switch, a push-to-make switch (202), and a push-to-break switch (203); wherein one end of the main sound box is coupled with the electric switch connected and activated simultaneously with the taxi meter and the push-to-make switch in serial connection with the electric switch and also connected and activated simultaneously with the door opening button for generating the reminding sound; and another end of the main sound box is coupled with the push-to-break switch in serial connection with the push-to-make switch, wherein the push-to-break switch is connected and activated simultaneously with the door closing button for stopping the reminding sound from the main sound box; wherein the push-to-break switch and the push-to-make switch are configured in such a manner that a tiny spark by switching the push-to-break switch and the push-to-make switch does not ignite an explosion of an external flammable gas probably existed therein.

10. The hand luggage reminder according to claim 9, wherein the push-to-break switch and/or the push-to-make switch is received in a respective cylindrical container (2021,2031) sealed with a screwing cap (2023,2033), a shaft (2024,2034) inserted through a vertical bearing (2025,2035) into the screwing cap and positioned on the push-to-break switch or the push-to-make switch, and the shaft is fixed to a ring (2027,2037) with its lower end and fixed to a push button (2026,2036) with its upper end, and the ring and the push button retain the shaft in the vertical bearing of the screwing cap in such a manner that the shaft is enabled to move up and down over a small range of distance.

* * * * *